(12) United States Patent
Akiyama

(10) Patent No.: US 11,474,424 B2
(45) Date of Patent: Oct. 18, 2022

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/476,347

(22) Filed: Sep. 15, 2021

(65) Prior Publication Data

US 2022/0082916 A1 Mar. 17, 2022

(30) Foreign Application Priority Data

Sep. 16, 2020 (JP) .............................. JP2020-155685

(51) Int. Cl.
*G03B 21/20* (2006.01)
*G02F 1/1335* (2006.01)
*G03B 33/12* (2006.01)
*G02B 27/28* (2006.01)
*G02B 5/30* (2006.01)

(52) U.S. Cl.
CPC ......... *G03B 21/204* (2013.01); *G02B 5/3083* (2013.01); *G02B 27/283* (2013.01); *G02F 1/133526* (2013.01); *G03B 21/208* (2013.01); *G03B 21/2013* (2013.01); *G03B 21/2066* (2013.01); *G03B 21/2073* (2013.01); *G03B 33/12* (2013.01)

(58) Field of Classification Search
CPC .............. G03B 21/204; G03B 21/2073; G03B 21/208; G03B 21/2013; G02B 5/3083; G02B 27/283

USPC ........................................................... 353/20
See application file for complete search history.

(56) References Cited

U.S. PATENT DOCUMENTS

| | | | |
|---|---|---|---|
| 5,161,042 A | 11/1992 | Hamada | |
| 10,444,611 B2 * | 10/2019 | Pan et al. ............. | G03B 21/204 |
| 10,915,014 B1 | 2/2021 | Akiyama | |
| 2005/0248736 A1 | 11/2005 | Itoh | |
| 2008/0062386 A1 | 3/2008 | Ito | |
| 2013/0027670 A1 | 1/2013 | Akiyama et al. | |
| 2020/0201155 A1 | 6/2020 | Akiyama | |
| 2020/0249555 A1 | 8/2020 | Akiyama | |
| 2020/0252589 A1 | 8/2020 | Akiyama | |

(Continued)

FOREIGN PATENT DOCUMENTS

| | | |
|---|---|---|
| JP | H04-060538 A | 2/1992 |
| JP | 2005-321502 A | 11/2005 |
| JP | 2008-065250 A | 3/2008 |

(Continued)

*Primary Examiner* — Jerry L Brooks
(74) *Attorney, Agent, or Firm* — Oliff PLC

(57) ABSTRACT

A light source device according to the present disclosure includes a light source section, a first polarization split layer for transmitting first light polarized in a first polarization direction and reflecting the first light polarized in a second polarization direction, a first optical layer and a second polarization split layer for transmitting the first light polarized in the first polarization direction, a second optical layer for reflecting the first light polarized in the first polarization direction, a diffusion element, a wavelength conversion element for performing wavelength conversion on the first light to emit second light, and a first color separation element.

22 Claims, 12 Drawing Sheets

(56) References Cited

U.S. PATENT DOCUMENTS

2020/0314397 A1    10/2020    Akiyama

FOREIGN PATENT DOCUMENTS

| | | |
|---|---|---|
| JP | 2013-167812 A | 8/2013 |
| JP | 2014-106453 A | 6/2014 |
| JP | 2014-182206 A | 9/2014 |
| JP | 2015-060035 A | 3/2015 |
| JP | 2019-053241 A | 4/2019 |
| JP | 2020-034821 A | 3/2020 |
| JP | 2020-101711 A | 7/2020 |
| JP | 2020-106692 A | 7/2020 |
| JP | 2020-126089 A | 8/2020 |
| JP | 2020-126170 A | 8/2020 |
| JP | 2020-160236 A | 10/2020 |
| JP | 2021-033165 A | 3/2021 |

* cited by examiner

LIGHT SOURCE DEVICE AND PROJECTOR

The present application is based on, and claims priority from JP Application Serial Number 2020-155685, filed Sep. 16, 2020, the disclosure of which is hereby incorporated by reference herein in its entirety.

BACKGROUND

1. Technical Field

The present disclosure relates to a light source device and a projector.

2. Related Art

There has been known a projector which modulates light emitted from a light source to generate image light based on image information, and then projects the image light thus generated. In JP-A-4-60538 (Document 1), there is disclosed a projection type color image display device provided with a light source, a plurality of dichroic mirrors, a liquid crystal display element having a microlens array, and a projection lens. The projection type color image display device separates the white light emitted from the light source into a plurality of colored light beams having respective colors different from each other, and then makes the colored light beams thus separated from each other enter the respective sub-pixels different from each other in one liquid crystal display element to thereby perform color display.

In the projection type color image display device described above, there are arranged a red reflecting dichroic mirror, a green reflecting dichroic mirror, and a blue reflecting dichroic mirror along the incident light axis of the white light emitted from the light source in a state of being nonparallel to each other. The white light emitted from the light source passes through the dichroic mirrors described above to thereby be separated into red light, green light, and blue light different in proceeding direction from each other. The red light, the green light, and the blue light respectively enter red sub-pixels, green sub-pixels, and blue sub-pixels of the light modulation element in the state of being spatially separated from each other by a microlens disposed at the incidence side of the light modulation element.

In the projection type color image display device in Document 1, a lamp light source such as a halogen lamp or a xenon lamp is adopted as the white light source, and a liquid crystal display element is adopted as the light modulation element. Although the light emitted from the lamp light source is unpolarized light, when using the liquid crystal display element as the light modulation element, the light entering the liquid crystal display element needs to be linearly polarized light having a specific polarization direction. To this end, it is conceivable to dispose a pair of multi-lens arrays for dividing the incident light into a plurality of partial light beams, and a polarization conversion element for uniforming the polarization directions of the plurality of partial light beams between the white light source and the liquid crystal display element as a device for homogenously illuminating the liquid crystal display element. In this case, there is often used a polarization conversion element provided with a plurality of polarization split layers and a plurality of reflecting layers alternately arranged along a direction crossing the incident direction of the light, and a retardation layer disposed in a light path of the light transmitted through the polarization split layers or a light path of the light reflected by the reflecting layers.

However, when reducing the projection type color image display device described above in size in compliance with the recent demand of reduction in size, it is difficult to manufacture the polarization conversion element narrow in pitch between the polarization split layer and the reflecting layer. Therefore, it is difficult to reduce the size of the light source device equipped with this type of polarization conversion element, and by extension, to reduce the size of the projector equipped with the light source device. In view of such a problem, it is required to provide a light source device capable of emitting a plurality of colored light beams uniformed in polarization direction without using the polarization conversion element narrow in pitch.

SUMMARY

In view of the problems described above, according to one aspect of the present disclosure, there is provided a light source device including a light source section configured to emit a first light beam which has a first wavelength band and includes light polarized in a first polarization direction and light polarized in a second polarization direction different from the first polarization direction, a first polarization split layer which is configured to transmit the first light beam entering the first polarization split layer from the light source section along a first direction and polarized in the first polarization direction toward the first direction, and is configured to reflect the first light beam polarized in the second polarization direction toward a second direction crossing the first direction, a first optical layer disposed at the first direction side of the first polarization split layer, and configured to transmit the first light beam which enters the first optical layer along the first direction from the first polarization split layer, and is polarized in the first polarization direction toward the first direction, a second polarization split layer disposed at the first direction side of the first optical layer, and configured to transmit the first light beam which enters the second polarization split layer along the first direction from the first optical layer, and is polarized in the first polarization direction, a second optical layer disposed at the first direction side of the second polarization split layer, and configured to reflect the first light beam which enters the second optical layer along the first direction from the second polarization split layer, and is polarized in the first polarization direction toward the second direction, a diffusion element configured to diffuse the first light beam entering the diffusion element along the second direction from the first polarization split layer, and configured to emit the first light beam diffused toward a third direction as an opposite direction to the second direction, a wavelength conversion element configured to perform wavelength conversion on the first light beam which enters the wavelength conversion element along the second direction from the second optical layer, and is polarized in the first polarization direction, and configured to emit a second light beam having a second wavelength band different from the first wavelength band toward the third direction, and a first color separation element disposed at the third direction side of the first optical layer, wherein the second light beam enters the second polarization split layer along the third direction from the wavelength conversion element, the second polarization split layer transmits the second light beam polarized in the first polarization direction toward the third direction, and reflects the second light beam polarized in the second polarization direction toward a fourth direction as an opposite direction to the first direction, the second optical layer transmits the second light beam which enters the second optical layer along the third direction from the second polarization split layer and is polarized in the first polarization direction toward the third direction, the first optical layer reflects the second light beam which enters the first optical layer along the fourth direction and is polarized in the second polarization direction toward the third direction, the first polarization split layer transmits the first light beam which is emitted along the third direction from the diffusion element and enters the first polarization split layer toward the third direction, the first optical layer transmits the first light beam which is emitted along the third direction from the first polarization split layer and enters the first optical layer toward the third direction, the first color separation element separates the second light beam which enters the first color separation element along the third direction from the first optical layer and is polarized in the second polarization direction into a third light beam having a third wavelength band different from the second wavelength band, and a fourth light beam having a fourth wavelength band different from the second wavelength band and the third wavelength band, and the fourth light beam separated by the first color separation element enters the wavelength conversion element.

According to one aspect of the present disclosure, there is provided a light source device including a light source section configured to emit a first light beam which has a first wavelength band and includes light polarized in a first polarization direction and light polarized in a second polarization direction different from the first polarization direction, a first polarization split layer which is configured to transmit the first light beam entering the first polarization split layer from the light source section along a first direction and polarized in the first polarization direction toward the first direction, and is configured to reflect the first light beam polarized in the second polarization direction toward a second direction crossing the first direction, a first optical layer disposed at the first direction side of the first polarization split layer, and configured to transmit the first light beam which enters the first optical layer along the first direction from the first polarization split layer, and is polarized in the first polarization direction toward the first direction, a second polarization split layer disposed at the first direction side of the first optical layer, and configured to transmit the first light beam which enters the second polarization split layer along the first direction from the first optical layer, and is polarized in the first polarization direction, a second optical layer disposed at the first direction side of the second polarization split layer, and configured to reflect the first light beam which enters the second optical layer along the first direction from the second polarization split layer, and is polarized in the first polarization direction toward the second direction, a diffusion element configured to diffuse the first light beam entering the diffusion element along the second direction from the first polarization split layer, and configured to emit the first light beam diffused toward a third direction as an opposite direction to the second direction, a wavelength conversion element configured to perform wavelength conversion on the first light beam which enters the wavelength conversion element along the second direction from the second optical layer, and is polarized in the first polarization direction, and configured to emit a second light beam having a second wavelength band different from the first wavelength band toward the third direction, and a first color separation element disposed at a fourth direction side of the first polarization split layer, the fourth direction being an opposite direction to the first direction, wherein the second light beam enters the second polarization split layer along the third direction from the wavelength conversion element, the second polarization split layer transmits the second light beam polarized in the first polarization direction toward the third direction, and reflects the second light beam polarized in the second polarization direction toward the fourth direction, the second optical layer transmits the second light beam which enters the second optical layer along the third direction from the second polarization split layer and is polarized in the first polarization direction toward the third direction, the second light beam polarized in the second polarization direction enters the first optical layer along the fourth direction, the first optical layer separates the second light beam polarized in the second polarization direction into a third light beam having a third wavelength band different from the second wavelength band, and a fourth light beam having a fourth wavelength band different from the second wavelength band and the third wavelength band, the first polarization split layer transmits the first light beam which is emitted along the third direction from the diffusion element and enters the first polarization split layer toward the third direction, and transmits the fourth light beam which enters the first polarization split layer in the fourth direction from the first optical layer, the first optical layer transmits the first light beam which is emitted along the third direction from the first polarization split layer and enters the first optical layer toward the third direction, the first color separation element transmits the first light beam emitted from the light source section toward the first direction, and reflects the fourth light beam which enters the first color separation element in the fourth direction from the first polarization split layer and has the fourth wavelength band toward the first direction, and the fourth light beam reflected by the first color separation element enters the wavelength conversion element.

According to one aspect of the present disclosure, there is provided a projector including the light source device according to the aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 9.

Figure 1:
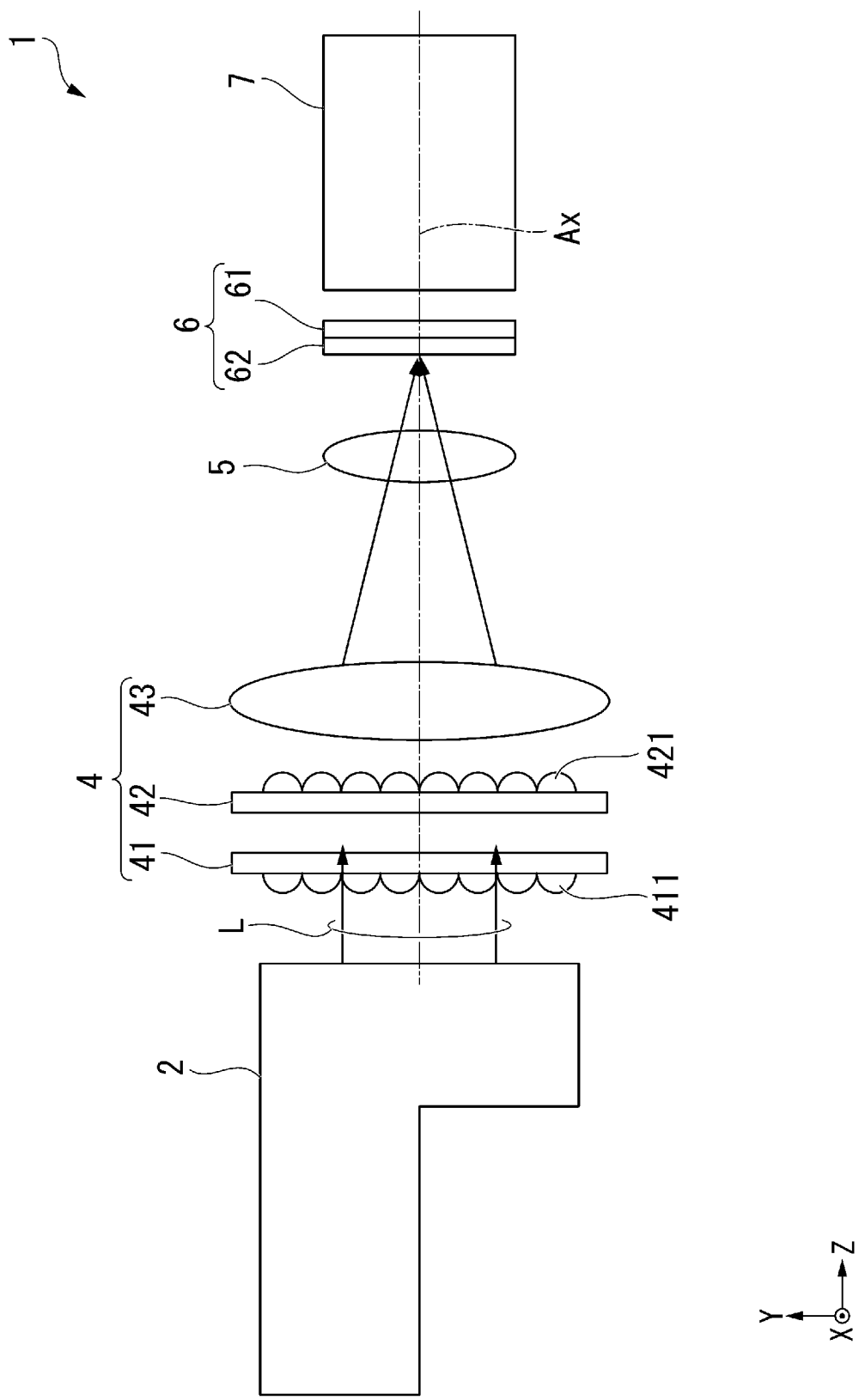
FIG. 1 is a schematic configuration diagram of a projector according to a first embodiment.

FIG. 1 is a schematic configuration diagram of a projector 1 according to the present embodiment.

It should be noted that in each of the drawings described below, the constituents are shown with the scale ratios of respective sizes set differently between the constituents in some cases in order to facilitate the visualization of each of the constituents.

The projector 1 according to the present embodiment modulates the light emitted from a light source device 2 to form an image corresponding to image information, and then projects the image thus formed on a projection target surface such as a screen in an enlarged manner. In other words, the projector 1 modulates the light emitted from the light source device 2 with a single light modulation device 6 including a single liquid crystal panel 61 to thereby form the image, and then projects the image thus formed. The projector 1 is a so-called single-panel projector.

As shown in FIG. 1, the projector 1 is provided with a light source device 2, a homogenization device 4, a field lens 5, a light modulation device 6, and a projection optical device 7. The light source device 2, the homogenization device 4, the field lens 5, the light modulation device 6, and the projection optical device 7 are disposed at predetermined positions along an illumination light axis Ax. The illumination light axis Ax is defined as an axis along the proceeding direction of the principal ray of the light L emitted from the light source 2.

The configuration of the light source device 2 and the homogenization device 4 will be described later in detail.

The field lens 5 is disposed between the homogenization device 4 and the light modulation device 6. The field lens 5 collimates the light L emitted from the homogenization device 4, and then guides the result to the light modulation device 6.

The projection optical device 7 projects the light modulated by the light modulation device 6, namely the light forming the image, on the projection target surface (not shown) such as a screen. The projection optical device 7 has a single projection lens or a plurality of projection lenses.

In the following description, the axis parallel to the proceeding direction of the light emitted from the light source device 2 along the illumination light axis Ax is defined as a Z axis, and the proceeding direction of the light is defined as a +Z direction. Further, two axes each perpendicular to the Z axis, and perpendicular to each other are defined as an X axis and a Y axis. Out of the directions along these axes, an upper side in the vertical direction in the space in which the projector 1 is installed is defined as a +Y direction. Further, the right side in the horizontal direction when viewing an object which the light enters along the +Z direction so that the +Y direction points the upper side in the vertical direction is defined as a +X direction. Although not shown in the drawings, an opposite direction to the +X direction is defined as a −X direction, an opposite direction to the +Y direction is defined as a −Y direction, and an opposite direction to the +Z direction is defined as a −Z direction.

The +X direction in the present embodiment corresponds to a first direction in the appended claims, and the −Z direction in the present embodiment corresponds to a second direction in the appended claims. Further, the +Z direction in the present embodiment corresponds to a third direction in the appended claims, and the −X direction in the present embodiment corresponds to a fourth direction in the appended claims.

Configuration of Light Source Device

Figure 2:
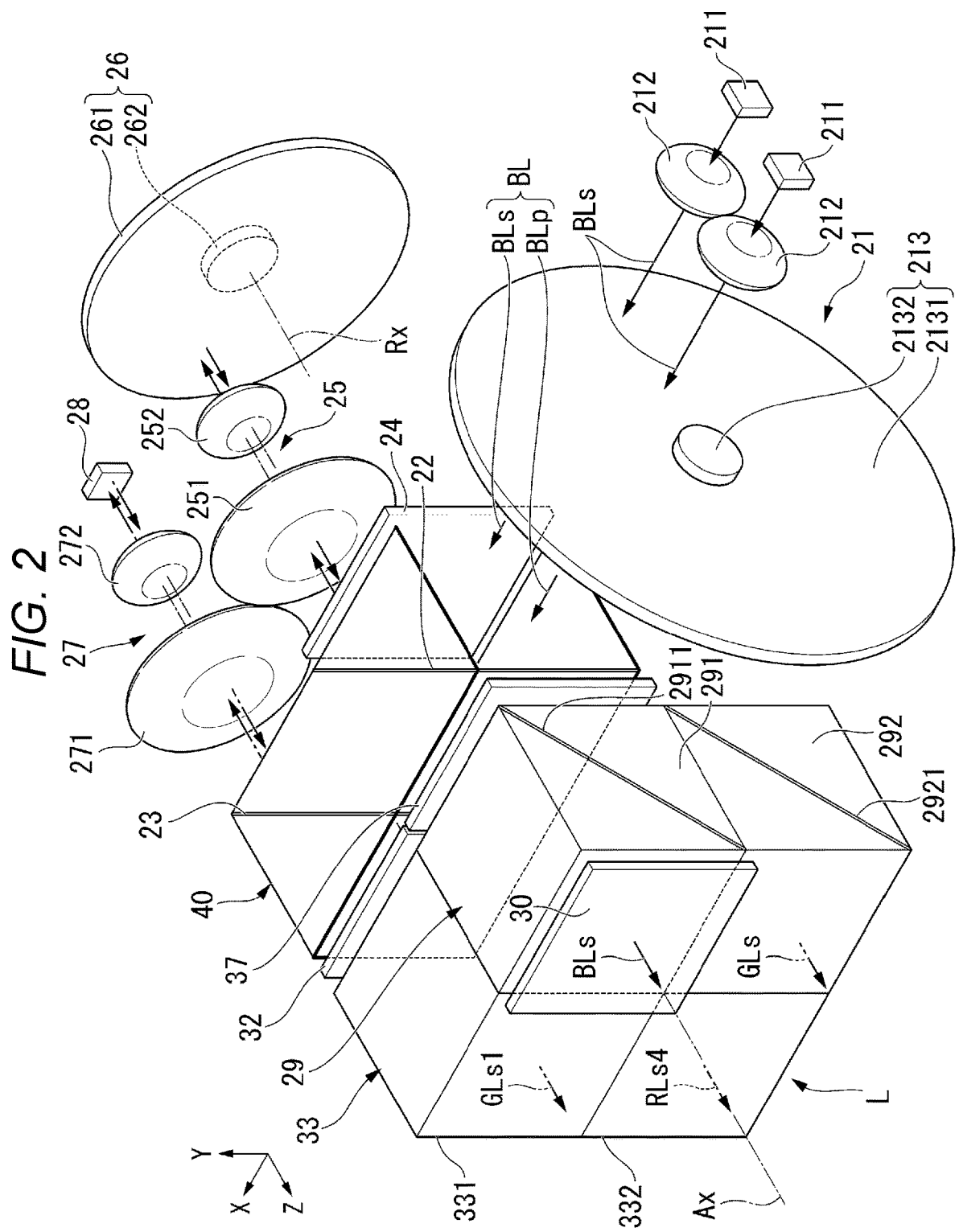
FIG. 2 is a perspective view of a light source device according to the first embodiment.
Figure 3:
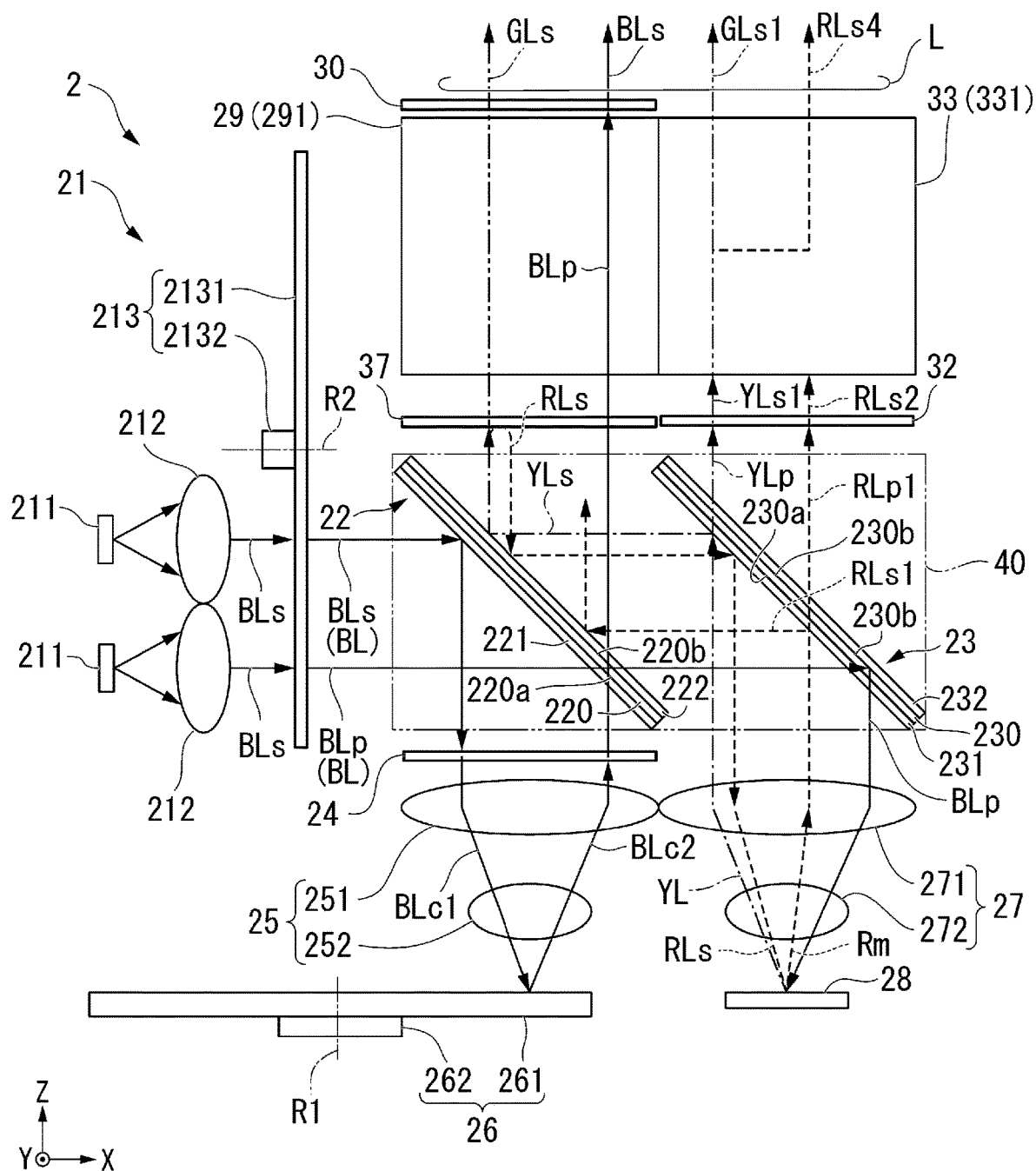
FIG. 3 is a plan view of the light source device viewed from a +Y direction.

FIG. 2 is a perspective view of the light source device 2 according to the present embodiment. FIG. 3 is a plan view of the light source device 2 viewed from the +Y direction.

As shown in FIG. 2 and FIG. 3, the light source device 2 emits the light L for illuminating the light modulation device 6 toward a direction parallel to the illumination light axis Ax, namely the +Z direction. The light L emitted by the light source device 2 includes a plurality of colored light beams which are linearly polarized light beams having a uniform polarization direction, and are spatially separated from each other. In the present embodiment, the light L emitted by the light source device 2 consists of four light beams each formed of S-polarized light. The four light beams correspond to a blue light beam BLs, a green light beam GLs, a green light beam GLs1, and a red light beam RLs4.

The light source device 2 has a light source section 21, a first optical member 22, a second optical member 23, a second retardation element 24, a first light collection element 25, a diffusion device 26, a second light collection element 27, a wavelength conversion element 28, a first color separation element 37, a second color separation element 29, a fourth retardation element 30, a fifth retardation element 32, a third color separation element 33, and a light tunnel 40.

It should be noted that a P-polarization component in the present embodiment corresponds to light polarized in a first polarization direction in the appended claims, and an S-polarization component corresponds to light polarized in a second polarization direction in the appended claims. Further, as described later, the first optical member 22 and the second optical member 23 are different in orientation of a film for separating the polarization components or the colored light beams from the second color separation element 29 and the third color separation element 33. Therefore, the descriptions of P-polarization component and S-polarization component represent the polarization direction with respect to the first optical member 22 and the second optical member 23, and are reversed in the polarization direction with respect to the second color separation element 29 and the third color separation element 33. Specifically, the P-polarization component with respect to the first optical member 22 and the second optical member 23 corresponds to the S-polarization component with respect to the second color separation element 29 and the third color separation element 33, and the S-polarization component with respect to the first optical member 22 and the second optical member 23 corresponds to the P-polarization component with respect to the second color separation element 29 and the third color separation element 33. It should be noted that in order to prevent confusion in the explanation, the P-polarization component and the S-polarization component are described as the polarization directions with respect to the first optical member 22 and the second optical member 23.

Configuration of Light Source Section

The light source section 21 emits the blue light beams BLs which enter the first optical member 22 along the +X direction. The light source section 21 has a plurality of light emitting elements 211, a plurality of collimator lenses 212, and a rotary retardation device 213. The light emitting elements 211 each formed of a solid-state light source for emitting the blue light beam BLs. Specifically, the light emitting elements 211 each formed of a semiconductor laser for emitting the blue light beam BLs as the S-polarized light. The blue light beam BLs is a laser beam having a blue wavelength band of, for example, 440 through 480 nm, and having a peak wavelength within a range of, for example, 450 through 460 nm. In other words, the light emitting elements 211 each emit the blue light beam BLs having the blue wavelength band. In the present embodiment, the blue light beam BLs having the blue wavelength band corresponds to light in a first wavelength band in the appended claims.

In the case of the present embodiment, the plurality of light emitting elements 211 is arranged along the Z axis.

Although the light source section 21 in the present embodiment has two light emitting elements 211, the number of the light emitting elements 211 is not limited, but the number of the light emitting elements 211 can be one. Further, the arrangement of the plurality of light emitting elements 211 is not limited as well. Further, the light emitting elements 211 are arranged so as to emit the blue light beams BLs having the S-polarization component, but can be arranged so as to emit the blue light beams having the P-polarization component since a light intensity ratio between the S-polarized light and the P-polarized light can arbitrarily be set due to the rotary retardation device 213. In other words, it is possible for the light emitting elements 211 to rotate as much as 90° centering on the emission optical axis.

The plurality of collimator lenses 212 is disposed between the plurality of light emitting elements 211 and the rotary retardation device 213. The collimator lenses 212 are disposed so as to correspond one-to-one to the light emitting elements 211. The collimator lens 212 collimates the light L emitted from the light emitting element 211.

The rotary retardation device 213 has a third retardation element 2131, and a rotary device 2132. The third retardation element 2131 is made rotatable centering on a rotational axis along a proceeding direction of the light entering the third retardation element 2131, namely a rotational axis R2 parallel to the X axis. The rotary device 2132 is formed of a motor and so on, and rotates the third retardation element 2131.

The third retardation element 2131 is formed of a ½ wave plate or a ¼ wave plate with respect to the blue wavelength band. A part of the blue light beam BLs as the S-polarization component having entered the third retardation element 2131 is converted into a blue light beam BLp as P-polarization component by the third retardation element 2131. Therefore, the blue light beam having been transmitted through the third retardation element 2131 turns to light in which the blue light beam BLs as the S-polarization component and the blue light beam BLp as the P-polarization component mixed with each other with a predetermined ratio. Specifically, the blue light beams BLs emitted from the light emitting elements 211 enter the third retardation element 2131, and the blue light beam including the blue light beam BLs as the S-polarization component and the blue light beam BLp as the P-polarization component is emitted from the third retardation element 2131.

By the rotary device 2132 adjusting the rotational angle of the third retardation element 2131, the ratio between the light intensity of the blue light beam BLs as the S-polarization component included in the light beam having been transmitted through the third retardation element 2131 and the light intensity of the blue light beam BLp as the P-polarization component included in the light beam having been transmitted through the third retardation element 2131 is adjusted. It should be noted that when there is no need to adjust the ratio between the light intensity of the blue light beam BLs and the light intensity of the blue light beam BLp, the rotary device 2132 for rotating the third retardation element 2131 is not required to be disposed. In that case, the rotational angle of the third retardation element 2131 is set so that the ratio between the light intensity of the blue light beam BLs and the light intensity of the blue light beam BLp becomes a predetermined light intensity ratio, and then the rotational position of the third retardation element 2131 is fixed.

In such a manner, the light source section 21 in the present embodiment emits a first light beam BL having the blue wavelength band and including the blue light beam BLs as the S-polarization component and the blue light beam BLp as the P-polarization component. In the present embodiment, the first light beam BL having the blue wavelength band in the present embodiment corresponds to a first light beam having a first wavelength band in the appended claims. Further, the blue light beam BLp as the P-polarization component corresponds to the light polarized in the first polarization direction in the appended claims, and the blue light beam BLs as the S-polarization component corresponds to the light polarized in the second polarization direction in the appended claims.

It should be noted that in the present embodiment, there is adopted the configuration in which all of the light emitting elements 211 emit the blue light beam BLs as the S-polarization component, but it is possible to adopt a configuration in which the light emitting element 211 for emitting the blue light beam BLs as the S-polarization component and the light emitting element 211 for emitting the blue light beam BLp as the P-polarization component are mixed. According to this configuration, it is also possible to omit the rotary retardation device 213. Further, it is also possible for the light emitting element 211 to be formed of another solid-state light source such as an LED (Light Emitting Diode) instead of the semiconductor laser.

Configuration of First Optical Member

The first light beam BL including the blue light beam BLs as the S-polarization component and the blue light beam BLp as the P-polarization component enters the first optical member 22 along the +X direction. The second optical member 22 is formed of a plate type polarization split element. The first optical member 22 has a first transparent substrate 220, a first polarization split layer 221, and a first optical layer 222. The first transparent substrate 220 has a first surface 220a and a second surface 220b facing to respective directions opposite to each other. The first transparent substrate 220 is formed of a general optical glass plate.

The first transparent substrate 220 is disposed so as to be tilted 45° with respect to the X axis and the Z axis. In other words, the first transparent substrate 220 is tilted 45° with respect to an X-Y plane and a Y-Z plane.

The first transparent substrate 220 is disposed so that the first surface 220a is directed toward the light source section 21. The first polarization split layer 221 is provided to the first surface 220a of the first transparent substrate 220.

Therefore, the first polarization split layer 221 is disposed so as to be opposed to the light source section 21, and at the same time, tilted 45° with respect to the X-Y plane and the Y-Z plane.

The first polarization split layer 221 has a polarization split characteristic of transmitting the P-polarization component and reflecting the S-polarization component out of the incident light. Further, the first polarization split layer 221 has a polarization split characteristic of transmitting the P-polarized light and reflecting the S-polarized light with respect to the light in the blue wavelength band. Therefore, the first optical member 22 transmits the blue light beam BLp as the P-polarization component along the +X direction, and reflects the blue light beam BLs as the S-polarization component toward the −Z direction out of the blue light beam which enters the first optical member 22 along the +X direction. The first polarization split layer 221 is formed of, for example, a dielectric multilayer film.

The first optical layer 222 is provided to the second surface 220b of the first transparent substrate 220. In other words, the first optical layer 222 is disposed at the +X direction side of the first polarization split layer 221. The first optical layer 222 has an optical characteristic of transmitting the light in the blue wavelength band irrespective of the polarization state, and reflecting light having a wavelength band longer than the blue wavelength band regardless of the polarization state. In the present embodiment, the first optical layer 222 is formed of a dichroic mirror. It should be noted that a dielectric multilayer film having a polarization split characteristic of transmitting the P-polarization component and reflecting the S-polarization component with respect to the light in the blue wavelength band and the yellow wavelength band can be used as the first optical layer 222.

It should be noted that since the first optical member 22 in the present embodiment is the plate type polarization split element, it is possible to separately design a function of the first polarization split layer 221 to be formed on the first surface 220a of the first transparent substrate 220 and a function of the first optical layer 222 to be formed on the second surface 220b of the first transparent substrate 220. Therefore, the film design of the first polarization split layer 221 and the first optical layer 222 becomes relatively easy.

The blue light beam BLp as the P-polarization component having been transmitted through the first polarization split layer 221 is transmitted through the first transparent substrate 220 to enter the first optical layer 222. The blue light beam BLp as the P-polarization component which enters the first optical layer 222 from the first polarization split layer 221 along the +X direction is transmitted by the first optical layer 222 in the +X direction.

According to the first optical member 22 having the configuration described above, it is possible to separate the first light beam BL having been emitted from the light source section 21 into the blue light beam BLp as the P-polarization component and the blue light beam BLs as the S-polarization component, transmit the blue light BLp as the P-polarization component in the +X direction to thereby make the blue light BLp enter the second optical member 23, and reflect the blue light beam BLs as the S-polarization component in the −Z direction to make the blue light beam BLs enter the diffusion device 26.

Configuration of Second Optical Member

The second optical member 23 is disposed at the +X direction side of the first optical member 22. In other words, the second optical member 23 is disposed at the +X direction side of the first optical layer 222. The blue light beam BLp as the P-polarization component having been transmitted through the first optical member 22 enters the second optical member 23. Similarly to the first optical member 22, the second optical member 23 is formed of a plate type polarization split element. The second optical member 23 has a second transparent substrate 230, a second polarization split layer 231, and a second optical layer 232.

The second transparent substrate 230 has a third surface 230a and a fourth surface 230b facing to respective directions opposite to each other. The second transparent substrate 230 is formed of a general optical glass plate.

The second transparent substrate 230 is disposed so as to be tilted 45° with respect to the X axis and the Z axis. In other words, the second transparent substrate 230 is tilted 45° with respect to the X-Y plane and the Y-Z plane.

The second transparent substrate 230 is disposed so that the third surface 230a is directed toward the first optical member 22. In other words, the third surface 230a of the second transparent substrate 230 and the second surface 220b of the first transparent substrate 220 are opposed to each other. The second polarization split layer 231 is provided to the third surface 230a of the second transparent substrate 230. Therefore, the second polarization split layer 231 is disposed so as to be opposed to the first optical layer 222, and at the same time, tilted 45° with respect to the X-Y plane and the Y-Z plane.

The second polarization split layer 231 has a polarization split characteristic of transmitting the P-polarization component and reflecting the S-polarization component with respect to the light in the yellow wavelength band. Further, the second polarization split layer 231 has a characteristic of transmitting the P-polarization component with respect to the light in the blue wavelength band. Therefore, the blue light beam BLp as the P-polarization component which enters the second polarization split layer 231 from the first optical layer 222 along the +X direction is transmitted by the second polarization split layer 231 in the +X direction. The second polarization split layer 231 is formed of, for example, a dielectric multilayer film. It should be noted that a dielectric multilayer film having a polarization split characteristic of transmitting the P-polarization component and reflecting the S-polarization component with respect to all of the light in the blue wavelength band, the red wavelength band, and the yellow wavelength band can be used as the second polarization split layer 231.

The second optical layer 232 is provided to the fourth surface 230b of the second transparent substrate 230. In other words, the second optical layer 232 is disposed at the +X direction side of the second polarization split layer 231. The second optical layer 232 has an optical characteristic of reflecting the light in the blue wavelength band, and at the same time, transmitting the light having the wavelength band longer than the blue wavelength band. The blue light beam BLp as the P-polarization component which enters the second optical layer 232 from the second polarization split layer 231 along the +X direction is reflected by the second optical layer 232 in the −Z direction.

In the present embodiment, since the second optical layer 232 is formed of the dichroic mirror, it is possible for the second optical layer 232 to accurately separate the incident light by reflecting or transmitting the incident light without using the polarization.

According to the second optical member 23 in the configuration described above, the blue light beam BLp as the P-polarization component having been transmitted through the first optical member 22 to enter the second optical member 23 in the +X direction can be reflected in the −Z direction to enter the wavelength conversion element 28.

Since the second optical member 23 in the present embodiment is the plate type polarization split element, it is possible to separately design a function of the second polarization split layer 231 to be formed on the third surface 230a of the second transparent substrate 230 and a function of the second optical layer 232 to be formed on the fourth surface 230b of the second transparent substrate 230. Therefore, the film design of the second polarization split layer 231 and the second optical layer 232 becomes relatively easy.

Configuration of Second Retardation Element

The second retardation element 24 is disposed at the −Z direction side of the first optical member 22. In other words, the second retardation element 24 is disposed between the first optical member 22 and the diffusion device 26 on the Z axis. The blue light beam BLs as the S-polarization component which has been reflected by the first polarization split 221 of the first optical member 22 in the −Z direction enters the second retardation element 24. The second retardation element 24 is formed of a ¼ wave plate with respect to the blue wavelength band of the blue light beam BLs which enters the ¼ wave plate. The blue light beam BLs as the S-polarization component having been reflected by the first optical member 22 is converted by the second retardation element 24 into, for example, a blue light beam BLc1 as clockwise circularly polarized light, and is then emitted toward the first light collection element 25. In other words, the second retardation element 24 converts the polarization state of the blue light beam BLs which enters the second retardation element 24.

Configuration of First Light Collection Element

The first light collection element 25 is disposed at the −Z direction side of the second retardation element 24. In other words, the first light collection element 25 is disposed between the second retardation element 24 and the diffusion device 26 on the Z axis. The first light collection element 25 converges the blue light beam BLc1 which enters the first light collection element 25 from the second retardation element 24 on a diffusion plate 261 of the diffusion device 26. Further, the first light collection element 25 collimates a blue light beam BLc2 described later entering the first light collection element 25 from the diffusion device 26. It should be noted that although in the example shown in FIG. 3, the first light collection element 25 is constituted by a first lens 251 and a second lens 252, the number of lenses constituting the first light collection element 25 is not limited.

Configuration of Diffusion Device

The diffusion device 26 is disposed at the −Z direction side of the first light collection element 25. In other words, the diffusion device 26 is disposed at the −Z direction side of the first optical member 22. The blue light beam BLc1 entering the diffusion device 26 from the first light collection element 25 in the −Z direction is reflected by the diffusion device 26 the +Z direction while diffusing the blue light beam BLc1 so as to have an equivalent diffusion angle to that of the yellow light beam YL emitted from the wavelength conversion element 28 described later. The diffusion device 26 is provided with a diffusion plate 261 and a rotary device 262. The diffusion plate 261 preferably has a reflection characteristic as close to the Lambertian scattering as possible, and reflects the blue light beam BLc1 having entered the diffusion plate 261 in a wide-angle manner. The rotary device 262 is formed of a motor and so on, and rotates the diffusion plate 261 centering on a rotational axis R1 parallel to the +Z direction.

The diffusion plate 261 in the present embodiment corresponds to a diffusion element in the appended claims.

The blue light beam BLc1 having entered the diffusion plate 261 is reflected by the diffusion plate 261 to thereby be converted into the blue light beam BLc2 as circularly polarized light having an opposite rotational direction. In other words, the blue light BLc1 as the clockwise circularly polarized light is converted by the diffusion plate 261 into the blue light BLc2 as counterclockwise circularly polarized light. The blue light beam BLc2 emitted from the diffusion device 26 passes the first light collection element 25 toward the +Z direction, and then enters the second retardation element 24 once again. On this occasion, the blue light beam BLc2 entering the second retardation element 24 from the first light collection element 25 is converted by the second retardation element 24 into the blue light beam BLp as the P-polarization component. The blue light beam BLp thus converted enters the first optical member 22. In other words, the blue light beam BLp which is emitted from the diffusion plate 261 along the +Z direction, and then enters the first polarization split layer 221 is transmitted by the first polarization split layer 221 in the +Z direction. The blue light beam BLp which is emitted from the first polarization split layer 221 along the +Z direction, and is transmitted through the first transparent substrate 220, and enters the first optical layer 222 is transmitted by the first optical layer 222 in the +Z direction. In such a manner, the blue light beam BLp thus converted is emitted from the first optical member 22 in the +Z direction, and then enters the first color separation element 37.

Configuration of Second Light Collection Element

The second light collection element 27 is disposed at the −Z direction side of the second optical member 23. In other words, the second light collection element 27 is disposed between the second optical member 23 and the wavelength conversion element 28 on the Z axis. The second light collection element 27 converges the blue light beam BLs reflected by the second optical member 23 on the wavelength conversion element 28. Further, the second light collection element 27 collimates the yellow light beam YL which is emitted from the wavelength conversion element 28 and is described later, and then emits the result toward the second optical member 23. It should be noted that although in the example shown in FIG. 3, the second light collection element 27 is constituted by a first lens 271 and a second lens 272, the number of lenses constituting the second light collection element 27 is not limited.

Configuration of Wavelength Conversion Element

The wavelength conversion element 28 is disposed at the −Z direction side of the second light collection element 27. In other words, the wavelength conversion element 28 is disposed at the −Z direction side of the second optical member 23. The wavelength conversion element 28 is a reflective wavelength conversion element which is excited by the light entering the wavelength conversion element, and emits the light different in wavelength from the light having entered the wavelength conversion element toward an opposite direction to the incident direction of the light. In other words, the wavelength conversion element 28 performs the wavelength conversion on the incident light, and then emits the light on which the wavelength conversion has been performed toward the opposite direction to the incident direction of the light.

In the present embodiment, the wavelength conversion element 28 includes a yellow phosphor which is excited by blue light and emits yellow light. Specifically, the wavelength conversion element 28 includes, for example, an yttrium aluminum garnet (YAG) type phosphor containing cerium (Ce) as an activator agent. The wavelength conversion element 28 emits fluorescence having a yellow wavelength band longer than the blue wavelength band of the blue light beam BLp entering the wavelength conversion element 28 along the −Z direction from the second optical layer 232 of the second optical member 23, namely the yellow light beam YL as unpolarized light, toward the +Z direction. The yellow light beam YL has a wavelength band of, for example, 500 through 650 nm. The yellow light beam YL is light which includes a green light component and a red light component, and in which the S-polarization component and the P-polarization component are mixed with each other in each of the colored light components.

The fluorescence having the yellow wavelength band in the present embodiment, namely the yellow light beam YL as the unpolarized light, corresponds to a second light beam having a second wavelength band in the appended claims.

The yellow light beam YL emitted from the wavelength conversion element 28 is transmitted by the second light collection element 27 toward the +Z direction to thereby be collimated, and then enters the second optical member 23. Although the wavelength conversion element 28 in the present embodiment is a stationary wavelength conversion element, instead of this configuration, it is possible to use a rotary wavelength conversion element provided with a rotary device for rotating the wavelength conversion element 28 centering on a rotational axis parallel to the Z axis. In this case, a rise in temperature of the wavelength conversion element 28 is suppressed, and thus, it is possible to increase the wavelength conversion efficiency.

As described above, the second polarization split layer 231 of the second optical member 23 has a polarization split characteristic of reflecting the S-polarized light and transmitting the P-polarized light out of the incident light. Therefore, out of the yellow light beam YL as unpolarized light having entered the second polarization split layer 231, the yellow light beam YLs as the S-polarization component is reflected by the second polarization split layer 231 toward the −X direction, and then enters the first optical layer 222 of the first optical member 22. As described above, the first optical layer 222 has an optical characteristic of reflecting the light having a longer wavelength band than the blue wavelength band irrespective of the polarization state. Therefore, the yellow light beam YLs as the S-polarization component which enters the first optical layer 222 along the −X direction is reflected by the first optical layer 222 toward the +Z direction. The yellow light beam YLs as the S-polarization component enters the first color separation element 37.

Meanwhile, out of the yellow light beam YL as unpolarized light having entered the second polarization split layer 231, the yellow light beam YLp as the P-polarization component is transmitted through the second polarization split layer 231 toward the +Z direction to enter the second optical layer 232. As described above, the second optical layer 232 has an optical characteristic of transmitting the light having the longer wavelength band than the blue wavelength band. Therefore, the yellow light beam YLp as the P-polarization component which enters the second optical layer 232 from the second polarization split layer 231 along the +Z direction is transmitted by the second optical layer 232 in the +Z direction.

According to the second optical member 23 in the present embodiment, it is possible to emit the yellow light beam YLp as the P-polarization component toward the +Z direction.

In the present embodiment, the yellow light beam YLp as the P-polarization component corresponds to the second light beam polarized in the first polarization direction in the appended claims, and the yellow light beam YLs as the S-polarization component corresponds to the second light beam polarized in the second polarization direction in the appended claims.

Configuration of Light Tunnel

Figure 4:
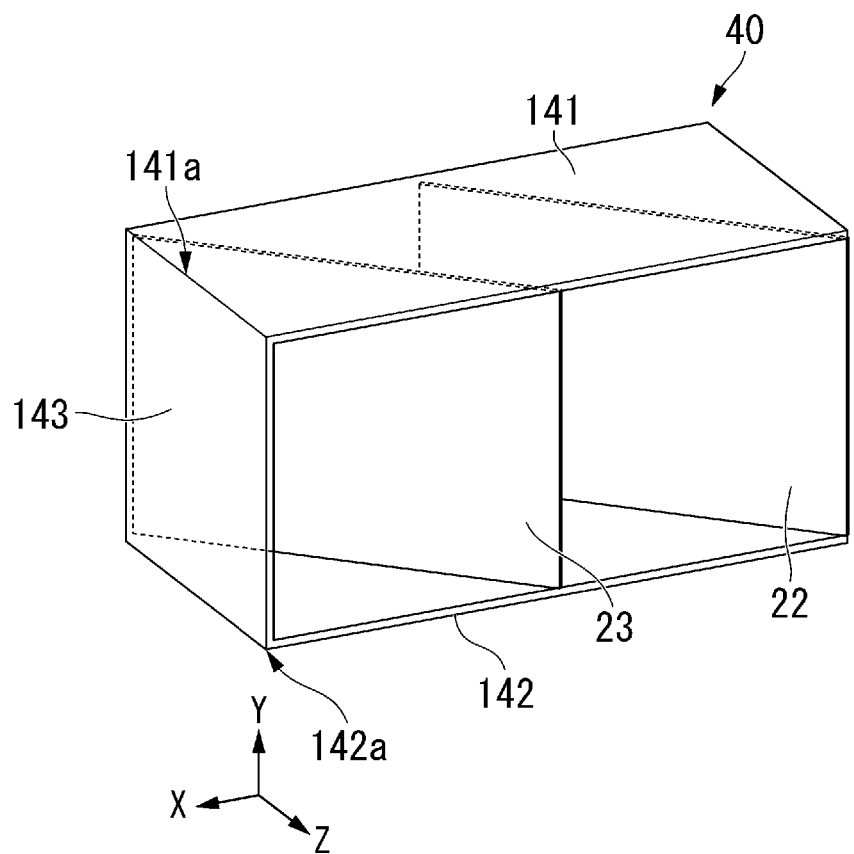
FIG. 4 is a perspective view showing a configuration of a light tunnel.
Figure 5:
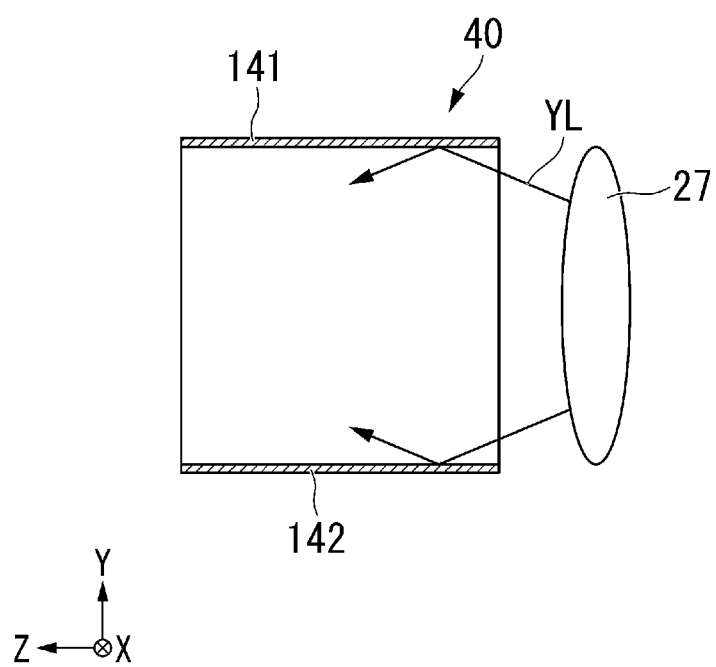
FIG. 5 is a side view of the light source device viewed from a −X direction toward a +X direction.

FIG. 4 is a perspective view showing a configuration of the light tunnel 40. FIG. 5 is a side view of the light tunnel 40 viewed from the −X direction toward the +X direction.

As shown in FIG. 4, the light tunnel 40 has a first mirror 141, a second mirror 142, and a third mirror 143. The first mirror 141, the second mirror 142, and the third mirror 143 are bonded to each other with an adhesive or the like. Further, the first transparent substrate 220 and the second transparent substrate 230 are bonded to the first mirror 141 and the second mirror 142 with an adhesive or the like. In the light tunnel 40 constituted by the first mirror 141, the second mirror 142, and the third mirror 143, all of the surfaces at the sides opposed respectively to the first optical member 22 and the second optical member 23 are made to be reflecting surfaces. Thus, the light tunnel 40 has a function of reflecting the light which proceeds toward the optical element in the posterior stage in a spreading manner to thereby suppress the loss of the light. Further, the light tunnel 40 has a function as a support member for supporting the first transparent substrate 220 and the second transparent substrate 230.

The first mirror 141 is disposed at the +Y direction side of the first transparent substrate 220 and the second transparent substrate 230. In the first mirror 141, at least an inner surface side which faces the first transparent substrate 220 and the second transparent substrate 230 is made to be a light reflecting surface.

The second mirror 142 is disposed at the −Y direction side of the first transparent substrate 220 and the second transparent substrate 230. In the second mirror 142, at least an inner surface side which faces the first transparent substrate 220 and the second transparent substrate 230 is made to be a light reflecting surface. The first mirror 141 and the second mirror 142 are disposed along the X-Y plane, and are opposed to each other.

The third mirror 143 is disposed so as to cross the first transparent substrate 220 and the second transparent substrate 230. The third mirror 143 is disposed along the Y-Z plane to couple an end part 141a at the +X direction side of the first mirror 141 and an end part 142a at the +X direction side of the second mirror 142 to each other. The third mirror 143 and the second transparent substrate 230 forms an angle of 45°. In the third mirror 143, at least an inner surface side which faces the second transparent substrate 230 is made to be a light reflecting surface.

It should be noted that in the present embodiment, the +Y direction corresponds to a fifth direction in the appended claims, and the −Y direction corresponds to a sixth direction in the appended claims.

It should be noted that the light tunnel 40 is not necessarily required to have the configuration in which the three plate members are bonded to each other as in the present embodiment, and can have a configuration in which at least two plate members are integrally formed.

Although in the present embodiment, the yellow light beam YL emitted from the wavelength conversion element 28 is substantially collimated by the second light collection element 27, some components thereof enter the second optical member 23 in a diverging state. Here, as a comparative example, a light source device obtained by eliminating the light tunnel 40 from the light source device 2 according to the present embodiment will be considered.

Since the second optical member 23 is the plate type polarization split element, when the light tunnel 40 is not provided as in the light source device according to the comparative example, there is a possibility that a part of the yellow light beam YL emitted from the second light collection element 27 spreads outside the second optical member 23, and thus, the light use efficiency of the yellow light beam YL decreases. It should be noted that when using the plate type polarization split element as the second optical member 23, it becomes possible to deflect the light, which is emitted from the second light collection element 27 with a wide angle, using a prism surface to take the light inside, but it become unachievable to obtain an advantage such as easiness of the film design due to the use of the plate type polarization split element.

In contrast, in the light source device 2 according to the present embodiment is provided with the light tunnel 40, by reflecting the yellow light beam YL having spread in the Y direction using the first mirror 141 and the second mirror 142, it is possible to take the yellow light beam YL in the second optical member 23 as shown in FIG. 5. In other words, according to the light source device 2 related to the present embodiment, it is possible to take the light, which is emitted with a wide angle from the second light collection element, inside as when configuring the second optical member with a prism type polarization split element despite the plate type polarization split element is used as the second optical member 23. Thus, it is possible to increase the light use efficiency of the yellow light beam YL.

It should be noted that although not shown in the drawings, for example, the yellow light beam YL having spread in the +X direction is reflected by the third mirror 143, and can therefore be taken in the second optical member 23. Further, by reflecting the blue light beam BLp having been emitted from the first light collection element 25 and having spread in the Y direction using the first mirror 141 and the second mirror 142, it is possible to take the blue light beam BLp in the first optical member 22. Thus, it is possible to increase the light use efficiency of the blue light beam BLp. Further, regarding the first light beam BL having been emitted from the light source section 21 in the state of spreading in the Y direction, by reflecting the first light beam BL using the first mirror 141 and the second mirror 142, it is possible to efficiently take the first light beam BL in the first optical member 22. Thus, it is possible to increase the light use efficiency of the first light beam BL.

Configuration of First Color Separation Element

The first color separation element 37 is disposed at the +Z direction side of the first optical member 22. The first color separation element 37 is formed of a dichroic mirror having a characteristic of transmitting the green light beam and reflecting the red light beam. The first color separation element 37 separates the yellow light beam YLs which enters the first color separation element 37 along the +Z direction from the first optical layer 222 of the first optical member 22 into the green light beam GLs and the red light beam RLs. The green light beam GLs is light having a green wavelength band out of the wavelength band of the yellow light beam YLs, and the red light beam RLs is light having a red wavelength band out of the wavelength band of the yellow light beam YLs.

The light having the green wavelength band in the present embodiment, namely the green light beam GLs, corresponds to a third light beam having a third wavelength band different from the second wavelength band in the appended claims. Further, the light having the red wavelength band in the present embodiment, namely the red light beam RLs, corresponds to a fourth light beam having a fourth wavelength band different from the third wavelength band in the appended claims.

The green light beam GLs included in the yellow light beam YLs is transmitted through the first color separation element 37, and is then emitted toward the +Z direction. In contrast, the red light beam RLs included in the yellow light beam YLs is reflected by the first color separation element 37. The red light beam RLs having been reflected by the first color separation element 37 enters the first optical layer 222 of the first optical member 22. As described above, the first optical layer 222 has a characteristic of reflecting the yellow light beam YLs, and therefore, reflects the red light beam RLs included in the yellow light beam YLs. The red light beam RLs having been reflected by the first optical layer 222 enters the second polarization split layer 231 of the second optical member 23. As described above, the second polarization split layer 231 has a characteristic of reflecting the yellow light beam YLs, and therefore, reflects the red light beam RLs included in the yellow light beam YLs. The red light beam RLs is collected by the second light collection element 27 enters, and then enters the wavelength conversion element 28. In other words, the red light beam RLs separated from the yellow light beam YLs in the first color separation element 37 is reflected by each of the first optical layer 222 and the second polarization split layer 231 to thereby enter the wavelength conversion element 28.

As described above, since the yellow phosphor included in the wavelength conversion element 28 hardly absorbs the yellow light beam having entered the wavelength conversion element 28 from the outside, the yellow phosphor hardly absorbs the red light beam RLs. Therefore, the red light beam RLs having entered the wavelength conversion element 28 is repeatedly reflected inside the wavelength conversion element 28 to thereby be emitted outside the wavelength conversion element 28 as the red light beam as unpolarized light including the S-polarized light and the P-polarized light mixed with each other together with the yellow light beam YL generated in the yellow phosphor. The red light beam RLm as the unpolarized light emitted from the wavelength conversion element 28 includes the red light beam as the S-polarization component and the red light beam as the P-polarization component half and half.

Similarly to the yellow light beam YLp, the red light beam RLm as the unpolarized light having entered the second optical member 23 is separated by the second polarization split layer 231 into the red light beam RLp1 as the P-polarization component and the red light beam RLs1 as the S-polarization component as shown in FIG. 3. In other words, similarly to the yellow light beam YLs, the red light beam RLs1 as the S-polarization component enters the first color separation element 37 via the second polarization split layer 231 and the first optical layer 222, and is then reflected by the first color separation element 37 to thereby return to the wavelength conversion element 28 once again. Further, the red light beam RLp1 as the P-polarization component which has been transmitted through the second polarization split layer 231 in the +Z direction is transmitted by the second optical layer 232 in the +Z direction. In other words, similarly to the yellow light beam YLp, the red light beam RLp1 as the P-polarization component is emitted from the second optical member 23 toward the +Z direction.

In the present embodiment, the red light beam RLm as the unpolarized light corresponds to the fourth light beam emitted from a wavelength conversion element in the appended claims. Further, the red light beam RLp1 as the P-polarization component corresponds to the light polarized in the first polarization direction in the appended claims. Further, the red light beam RLs1 as the S-polarization component corresponds to the light polarized in the second polarization direction in the appended claims.

Configuration of Second Color Separation Element

Figure 6:
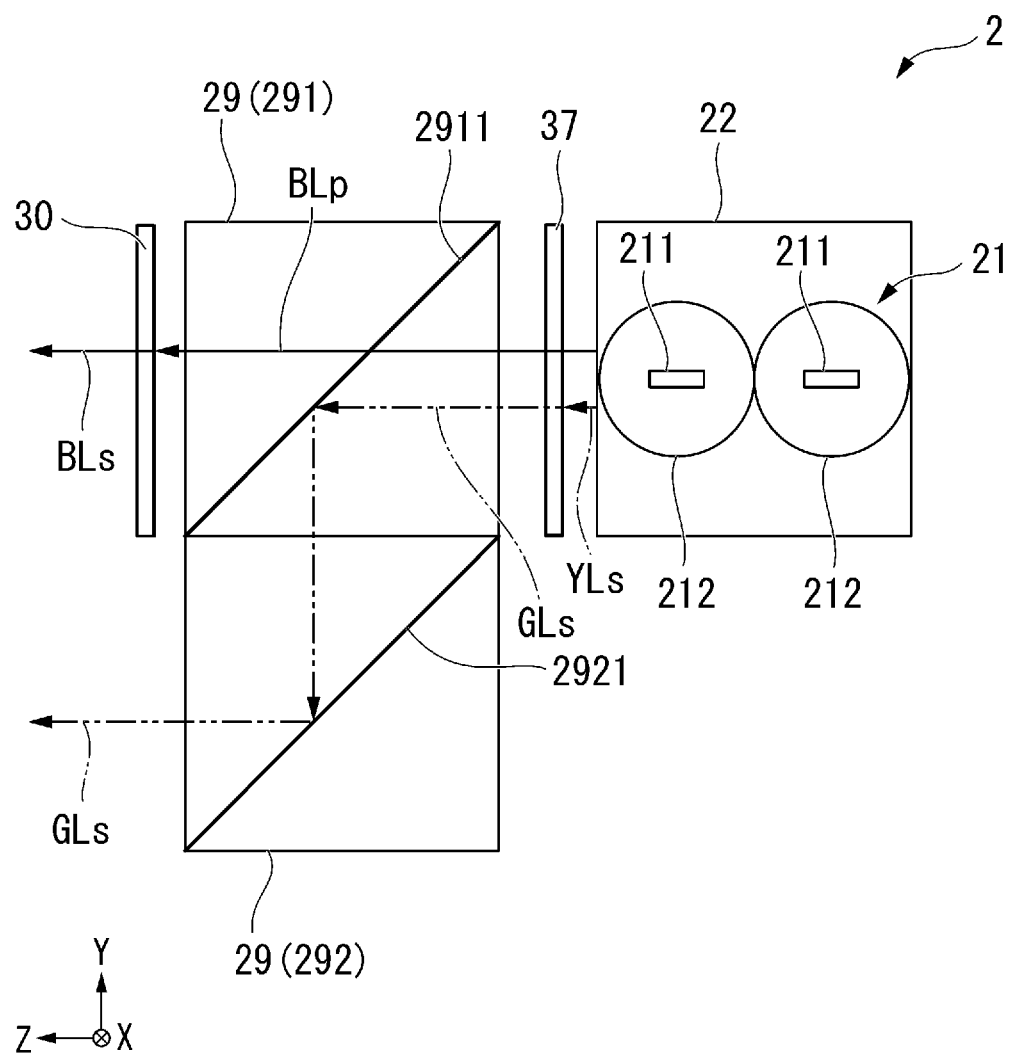
FIG. 6 is a side view of the light source device viewed from the −X direction.

FIG. 6 is a side view of the light source device 2 viewed from the −X direction. In other words, FIG. 6 shows the state of the second color separation element 29, the fourth retardation element 30, and so on viewed from the −X direction. In FIG. 6, in order to make the drawing eye-friendly, illustration of the rotary retardation device 213, the second retardation element 24, the first light collection element 25, the diffusion device 26, and so on is omitted.

As shown in FIG. 6, the second color separation element 29 is disposed at the +Z direction side of the first optical member 22. The second color separation element 29 has a dichroic prism 291 and a reflecting prism 292. The dichroic prism 291 and the reflecting prism 292 are arranged side by side along the Y axis. The second color separation element 29 separates the light emitted toward the +Z direction from the first optical member 22 into the blue light beam BLp and the green light beam GLs.

The light including the blue light beam BLp and the green light beam GLs emitted from the first optical member 22 enters the dichroic prism 291. The dichroic prism 291 is formed of a prism type color separation element formed by combining two base members each having a substantially isosceles right triangular prismatic shape with each other to form a substantially rectangular solid shape. On the interface between the two base members, there is disposed a color separation layer 2911. The color separation layer 2911 is tilted 45° with respect to the Y axis and the Z axis. In other words, the color separation layer 2911 is tilted 45° with respect to the X-Y plane and the X-Z plane.

The color separation layer 2911 functions as a dichroic mirror which transmits the blue light beam and reflects a colored light beam having a longer wavelength band than the blue wavelength band, namely the green light beam, out of the incident light. Therefore, the blue light beam BLp out of the light beam having entered the dichroic prism 291 from the first optical member 22 is transmitted through the color separation layer 2911 toward the +Z direction to be emitted outside the dichroic prism 291.

In contrast, the green light beam GLs out of the light beam having entered the dichroic prism 291 from the first optical member 22 is reflected toward the −Y direction by the color separation layer 2911. It should be noted that it is possible to adopt a dichroic mirror having the color separation layer 2911 instead of the dichroic prism 291. Further, it is possible for the second color separation element 29 to have a configuration having a polarization split element having a polarization split layer, and the reflecting prism 292. Even when a polarization split element which, for example, transmits the blue light beam BLp having entered the polarization split element toward the +Z direction, and reflects the green light beam GLs in the −Y direction toward the reflecting prism 292 is adopted in the second color separation element 29 instead of the dichroic prism 291, it is possible to separate the blue light beam BLp and the green light beam GLs from each other similarly to the second color separation element 29 having the dichroic prism 291.

The reflecting prism 292 is disposed at the −Y direction side of the dichroic prism 291. The yellow light beam YLs reflected by the color separation layer 2911 enters the reflecting prism 292. The reflecting prism 292 is a prism type reflecting element formed by combining two base members each having a substantially isosceles right triangular prismatic shape with each other to form a substantially rectangular solid shape. On the interface between the two base members, there is disposed a reflecting layer 2921. The reflecting layer 2921 is tilted 45° with respect to the +Y direction and the +Z direction. In other words, the reflecting layer 2921 is tilted 45° with respect to the X-Y plane and the X-Z plane. In other words, the reflecting layer 2921 and the color separation layer 2911 are arranged in parallel to each other.

The green light beam GLs which enters the reflecting layer 2921 in the −Y direction from the dichroic prism 291 is reflected toward the +Z direction by the reflecting layer 2921. The green light beam GLs reflected by the reflecting layer 2921 is emitted from the reflecting prism 292 toward the +Z direction. It should be noted that it is possible to adopt a reflecting mirror having the reflecting layer 2921 instead of the reflecting prism 292.

Configuration of Fourth Retardation Element

The fourth retardation element 30 is disposed at the +Z direction side of the dichroic prism 291. In other words, the fourth retardation element 30 is disposed on the light path of the blue light beam BLp emitted from the dichroic prism 291. The fourth retardation element 30 is formed of a ½ wave plate with respect to the blue wavelength band which the blue light beam BLp entering the ½ wave plate has. The fourth retardation element 30 converts the blue light beam BLp which enters the fourth retardation element 30 from the dichroic prism 291 into the blue light beam BLs as the S-polarization component. The blue light beam BLs having been converted by the fourth retardation element 30 into the S-polarization component is emitted from the light source device 2 toward the +Z direction, and then enters the homogenization device 4 shown in FIG. 1. It should be noted that the fourth retardation element 30 can be disposed so as to have contact with a surface from which the blue light beam BLp is emitted of the dichroic prism 291.

In other words, the green light beam GLs is spatially separated from the blue light beam BLs, and is emitted from an exit position different from the exit position of the blue light beam BLs in the light source device 2, and then enters the homogenization device 4. In particular, the green light beam GLs is emitted from the exit position distant toward the −Y direction from the exit position of the blue light beam BLs in the light source device 2, and then enters the homogenization device 4.

Configuration of Fifth Retardation Element

Figure 7:
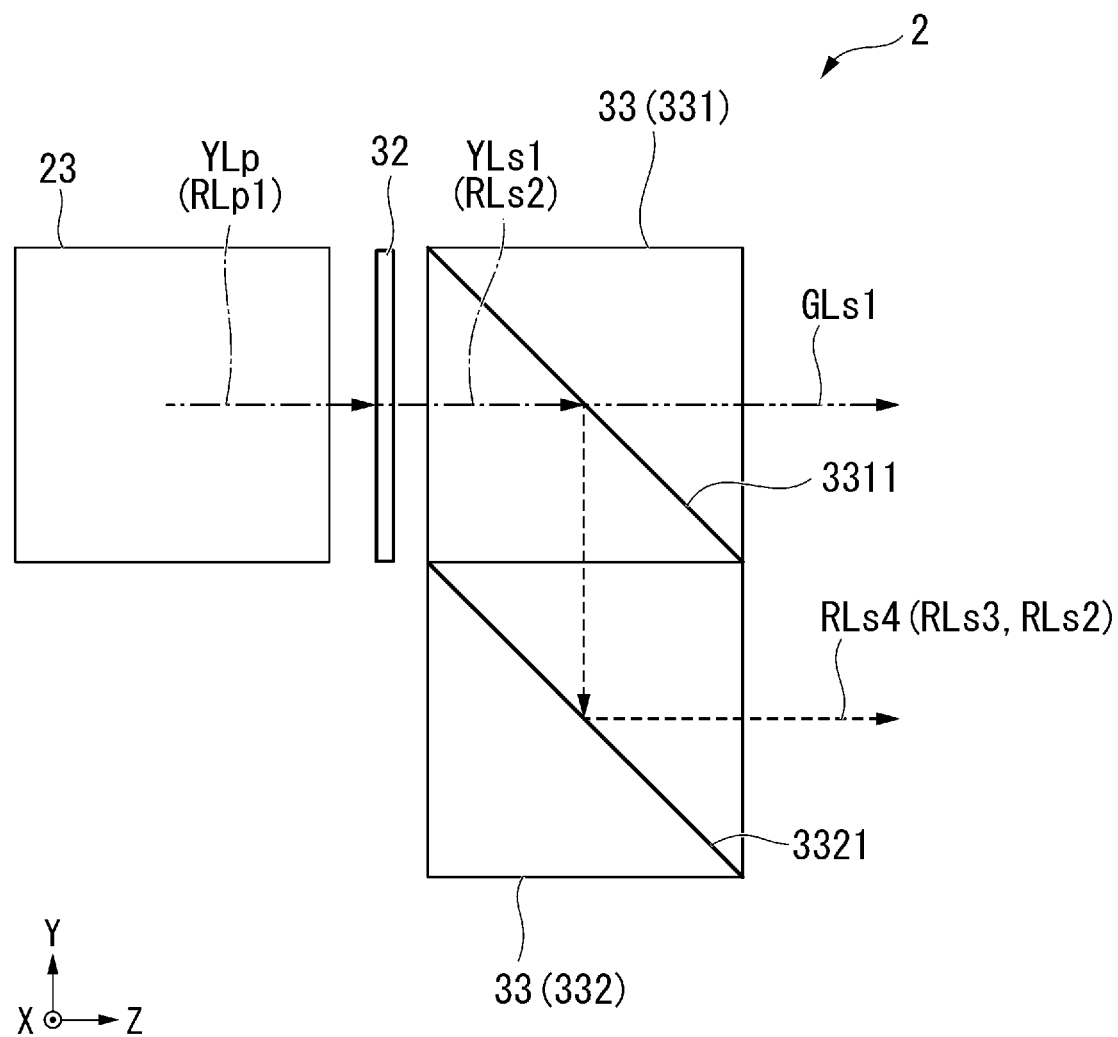
FIG. 7 is a side view of the light source device viewed from the +X direction.

FIG. 7 is a side view of the light source device 2 viewed from the +X direction. In other words, FIG. 7 shows the fifth retardation element 32 and the third color separation element 33 viewed from the +X direction. It should be noted that in FIG. 7, the second light collection element 27 and the wavelength conversion element 28 are omitted from the illustration.

As shown in FIG. 3 and FIG. 7, the fifth retardation element 32 is disposed at the +Z direction side of the second optical member 23. The yellow light beam YLp having been transmitted through the second optical member 23 enters the fifth retardation element 32. The red light beam RLp1 which is separated from the yellow light beam YLs by the first color separation element 37, then emitted from the wavelength conversion element 28, and is then transmitted through the second optical member 23 enters the fifth retardation element 32. The fifth retardation element 32 is formed of a ½ wave plate with respect to the yellow wavelength band of the yellow light beam YLp and the red wavelength band of the red light beam RLp1. The fifth retardation element 32 converts the yellow light beam YLp as the P-polarization component into the yellow light beam YLs1 as the S-polarization component, and converts the red light beam RLp1 as the P-polarization component into the red light beam RLs2 as the S-polarization component. The yellow light beam YLs1 and the red light beam RLs2 each converted into the S-polarization component enter the third color separation element 33.

Configuration of Third Color Separation Element

As shown in FIG. 7, the third color separation element 33 is disposed at the +Z direction side of the fifth retardation element 32. In other words, the third color separation element 33 is disposed at the +Z direction side of the second optical member 23. The third color separation element 33 has a dichroic prism 331 and a reflecting prism 332. The dichroic prism 331 and the reflecting prism 332 are arranged side by side along the Y axis. The yellow light beam YLs1 which has been emitted from the second optical member 23 toward the +Z direction and then converted by the fifth retardation element 32 into the S-polarization component is separated by the third color separation element 33 into the green light beam GLs1 and the red light beam RLs3.

The dichroic prism 331 is formed of a prism type color separation element similarly to the dichroic prism 291. On the interface between the two base members, there is disposed a color separation layer 3311. The color separation layer 3311 is tilted 45° with respect to the +Y direction and the +Z direction. In other words, the color separation layer 3311 is tilted 45° with respect to the X-Y plane and the X-Z plane. The color separation layer 3311 and the reflecting layer 3321 are arranged in parallel to each other.

The color separation layer 3311 functions as a dichroic mirror for transmitting the green light component of the incident light, and reflecting the red light component thereof. Therefore, the green light beam GLs1 as the S-polarized light out of the yellow light beam YLs1 having entered the dichroic prism 331 is transmitted through the color separation layer 3311 toward the +Z direction to be emitted outside the dichroic prism 331. The green light beam GLs1 as the S-polarized light is emitted from the light source device 2 toward the +Z direction, and then enters the homogenization device 4. In other words, the green light beam GLs1 is spatially separated from the blue light beam BLs and the green light beam GLs, and is emitted from a position different from those of the blue light beam BLs and the green light beam GLs, and then enters the homogenization device 4. In other words, the green light beam GLs1 is emitted from the exit position distant toward the +X direction from the exit position of the blue light beam BLs in the light source device 2, and then enters the homogenization device 4.

In contrast, the red light beam RLs3 as the S-polarization component out of the yellow light beam YLs1 having entered the dichroic prism 331 is reflected toward the −Y direction by the color separation layer 3311. Further, the red light beam RLs2 having been converted by the fifth retardation element 32 into the S-polarization component is reflected by the color separation layer 3311 toward the −Y direction together with the red light beam RLs3 as the S-polarization component. It should be noted that it is possible to use a dichroic mirror having the color separation layer 3311 instead of the dichroic prism 331.

The reflecting prism 332 has substantially the same configuration as the reflecting prism 292. Specifically, the reflecting prism 332 has a reflecting layer 3321 which is parallel to the color separation layer 3311, and the reflecting layer 2921.

The red light beam RLs2 and the red light beam RLs3 which are reflected by the color separation layer 3311, and then enter the reflecting layer 3321 are reflected by the reflecting layer 3321 toward the +Z direction. The red light beam RLs2 and the red light beam RLs3 having been reflected by the reflecting layer 3321 are emitted outside the reflecting prism 332. Hereinafter, the red light beam RLs2 and the red light beam RLs3 are correctively referred to simply as a red light beam RLs4.

The red light beam RLs4 is emitted from the light source device 2 toward the +Z direction, and then enters the homogenization device 4. In other words, the red light beam RLs4 is spatially separated from the blue light beam BLs, the green light beam GLs, and the green light beam GLs1, and is emitted from a position different from those of the blue light beam BLs, the green light beam GLs, and the green light beam GLs1, and then enters the homogenization device 4. In other words, the red light beam RLs4 is emitted from the exit position which is distant toward the −Y direction from the exit position of the green light beam GLs1 in the light source device 2, and is distant toward the +X direction from the exit position of the green light beam GLs, and then enters the homogenization device 4.

Configuration of Homogenization Device

As shown in FIG. 1, the homogenization device 4 homogenizes the illuminance in the image formation area of the light modulation device 6 irradiated with the light beams emitted from the light source device 2. The homogenization device 4 has a first multi-lens 41, a second multi-lens 42, and a superimposing lens 43.

The first multi-lens 41 has a plurality of lenses 411 arranged in a matrix in a plane perpendicular to a central axis of the light L entering the first multi-lens 41 from the light source device 2, namely the illumination light axis Ax. The first multi-lens 41 divides the light entering the first multi-lens 41 from the light source device 2 into a plurality of partial light beams with the plurality of lenses 411.

Figure 8:
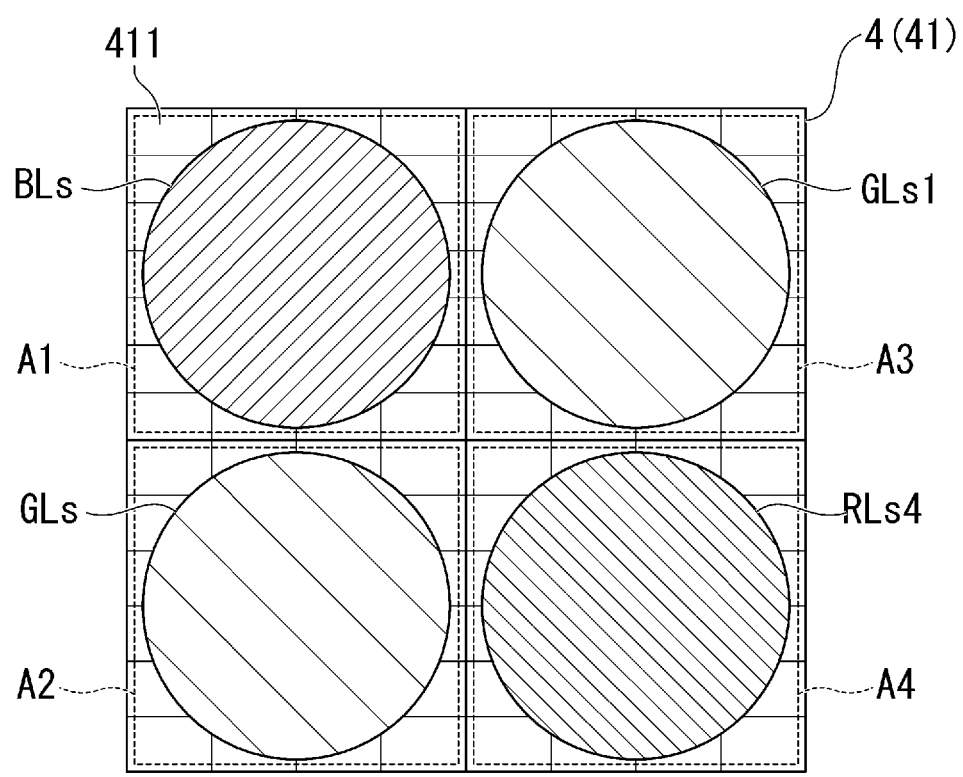
FIG. 8 is a schematic diagram showing positions of incidence of colored light beams on a multi-lens.

FIG. 8 is a schematic diagram showing positions of incidence of the respective colored light beams in the first multi-lens 41 viewed from the −Z direction.

As shown in FIG. 8, the blue light beam BLs, the green light beam GLs, the green light beam GLs1, and the red light beam RLs4 emitted from the light source device 2 enter the first multi-lens 41. The blue light beam BLs emitted from the position at the −X direction side and at the +Y direction side in the light source device 2 enters a plurality of lenses 411 included in an area A1 located at the −X direction side and at the +Y direction side in the first multi-lens 41. Further, the green light beam GLs emitted from the position at the −X direction side and at the −Y direction side in the light source device 2 enters a plurality of lenses 411 included in an area A2 located at the −X direction side and at the −Y direction side in the first multi-lens 41.

The green light beam GLs1 emitted from the position at the +X direction side and at the +Y direction side in the light source device 2 enters a plurality of lenses 411 included in an area A3 located at the +X direction side and at the +Y direction side in the first multi-lens 41. The red light beam RLs4 emitted from the position at the +X direction side and at the −Y direction side in the light source device 2 enters a plurality of lenses 411 included in an area A4 located at the +X direction side and at the −Y direction side in the first multi-lens 41. Each of the colored light beams having entered the lenses 411 turns to a plurality of partial light beams, and enters lenses 421 corresponding respectively to the lenses 411 in the second multi-lens 42. Out of the light L emitted from the light source device 2 according to the present embodiment, the blue light beam BLs corresponds to a fifth light beam in the appended claims, the green light beam GLs corresponds to a sixth light beam in the appended claims, the green light beam GLs1 corresponds to a seventh light beam in the appended claims, and the red light beam RLs4 corresponds to an eighth light beam in the appended claims.

As shown in FIG. 1, the second multi-lens 42 has the plurality of lenses 421 which is arranged in a matrix in a plane perpendicular to the illumination light axis Ax, and at the same time, corresponds respectively to the plurality of lenses 411 of the first multi-lens 41. The plurality of partial light beams emitted from the lenses 411 corresponding respectively to the lenses 421 enters the respective lenses 421. Each of the lenses 421 makes the partial light beam having entered the lens 421 enter the superimposing lens 43.

The superimposing lens 43 superimposes the plurality of partial light beams entering the superimposing lens 43 from the second multi-lens 42 on each other in the image formation area of the light modulation device 6. In particular, the second multi-lens 42 and the superimposing lens 43 make the blue light beam BLs, the green light beam GLs, the green light beam GLs1, and the red light beam RLs4 each divided into the plurality of partial light beams enter a plurality of microlenses 621 constituting a microlens array 62 described later of the light modulation device 6 at respective angles different from each other via the field lens 5.

Configuration of Light Modulation Device

As shown in FIG. 1, the light modulation device 6 modulates the light emitted from the light source device 2. In particular, the light modulation device 6 modulates each of the colored light beams which are emitted from the light source device 2, and then enter the light modulation device 6 via the homogenization device 4 and the field lens 5 in accordance with image information to form the image light corresponding to the image information. The light modulation device 6 is provided with the single liquid crystal panel 61 and a single microlens array 62.

Configuration of Liquid Crystal Panel

Figure 9:
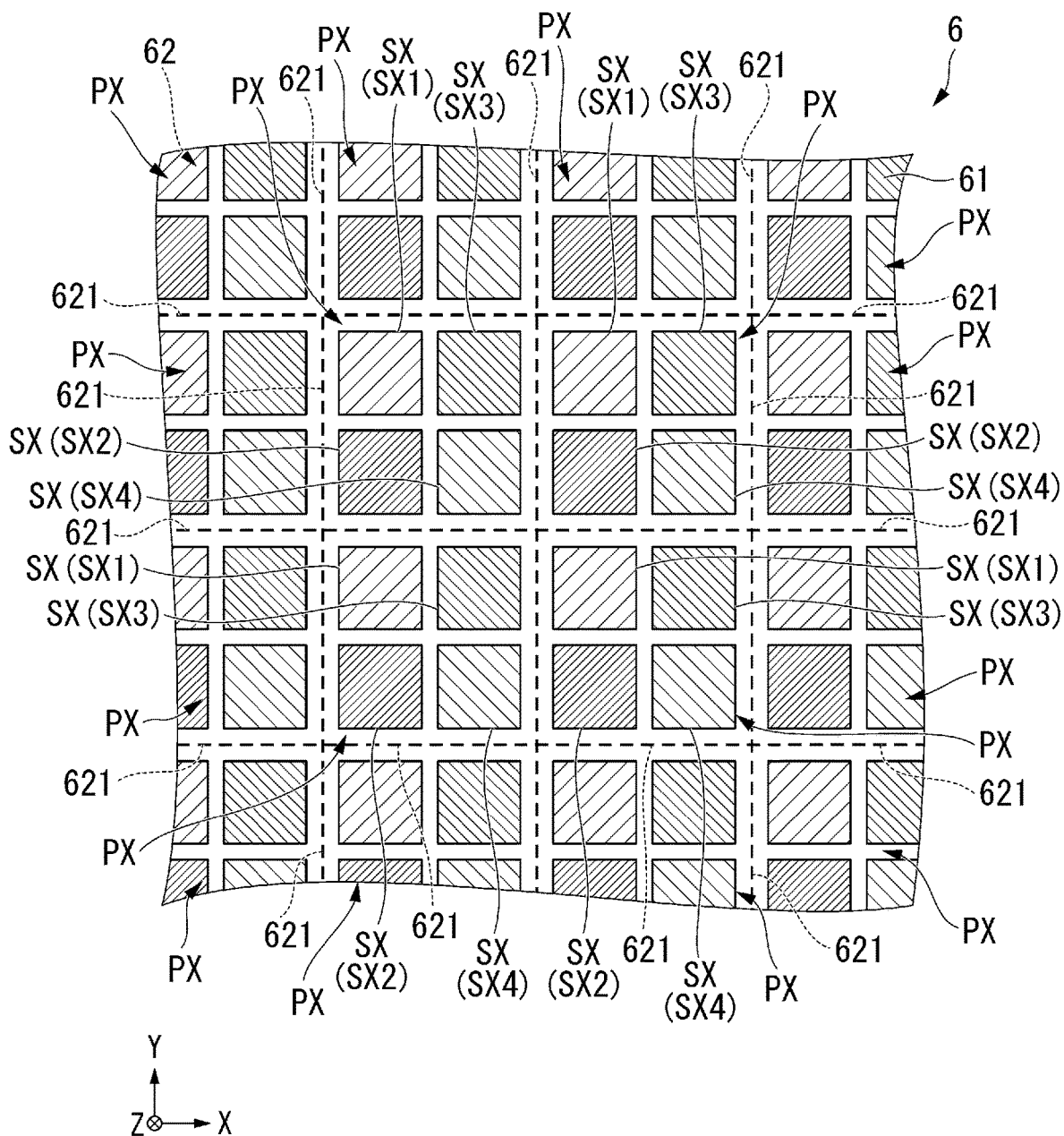
FIG. 9 is an enlarged view of a light modulation device.

FIG. 9 is a schematic enlarged view of a part of the light modulation device 6 viewed from the −Z direction. In other words, FIG. 9 shows a correspondence relationship between the pixels PX provided to the liquid crystal panel 61 and the microlenses 621 provided to the microlens array 62.

As shown in FIG. 9, the liquid crystal panel 61 has the plurality of pixels PX arranged in a matrix in a plane perpendicular to the illumination light axis Ax.

Each of the pixels PX has a plurality of sub-pixels SX for respectively modulating colored light beams different in color from each other. In the present embodiment, each of the pixels PX has four sub-pixels SX (SX1 through SX4). Specifically, in one pixel PX, the first sub-pixel SX1 is disposed at a position at the −X direction side and at the +Y direction side. The second sub-pixel SX2 is disposed at a position at the −X direction side and at the −Y direction side. The third sub-pixel SX3 is disposed at a position at the +X direction side and at the +Y direction side. The fourth sub-pixel SX4 is disposed at a position at the +X direction side and at the −Y direction side.

Configuration of Microlens Array

As shown in FIG. 1, the microlens array 62 is disposed at the −Z direction side as the side of incidence of light with respect to the liquid crystal panel 61. The microlens array 62 guides the colored light beams entering the microlens array 62 to the individual pixels PX. The microlens array 62 has the plurality of microlenses 621 corresponding to the plurality of pixels PX.

As shown in FIG. 9, the plurality of microlenses 621 is arranged in a matrix in a plane perpendicular to the illumination light axis Ax. In other words, the plurality of microlenses 621 is arranged in a matrix in an orthogonal plane with respect to the central axis of the light entering the plurality of microlenses 621 from the field lens 5. In the present embodiment, one microlens 621 is disposed so as to correspond to the two sub-pixels arranged in the +X direction and the two sub-pixels arranged in the +Y direction. In other words, one microlens 621 is disposed so as to correspond to the four sub-pixels SX1 through SX4 arranged 2×2 in the X-Y plane.

The blue light beam BLs, the green light beam GLs, the green light beam GLs1, and the red light beam RLs4 superimposed by the homogenization device 4 enter the microlenses 621 at respective angles different from each other. The microlenses 621 make the colored light beams entering the microlens 621 enter the sub-pixels SX corresponding to the colored light beams. Specifically, the microlens 621 makes the blue light beam BLs enter the first sub-pixel SX1 out of the sub-pixels SX of the pixel PX corresponding to the microlens 621, makes the green light beam GLs enter the second sub-pixel SX2, makes the green light beam GLs1 enter the third sub-pixel SX3, and makes the red light beam RLs4 enter the fourth sub-pixel SX4. Thus, the colored light beams corresponding respectively to the sub-pixels SX1 through SX4 enter the respective sub-pixels SX1 through SX4, and the colored light beams are respectively modulated by the corresponding sub-pixels SX1 through SX4. In such a manner, the image light modulated by the liquid crystal panel 61 is projected by the projection optical device 7 on the projection target surface not shown.

Advantages of First Embodiment

In the related-art projector described in Document 1, the lamp is used as the light source. Since the light emitted from the lamp is not uniform in polarization direction, in order to use the liquid crystal panel as the light modulation device, a polarization conversion device for uniforming the polarization direction becomes necessary. For the projector, there is generally used the polarization conversion device provided with a multi-lens array and a polarization split element (PBS) array. However, in order to reduce the size of the projector, there are required the multi-lens array and the PBS array narrow in pitch, but it is extremely difficult to form the PBS array narrow in pitch.

To cope with this problem, in the present embodiment, the four colors of colored light beams uniform in the polarization direction, namely the blue light beam BLs as the S-polarization component, the green light beam GLs as the S-polarization component, the green light beam GLs1 as the S-polarization component, and the red light beam RLs4 as the S-polarization component, are emitted from the light source device 2. According to this configuration, it is possible to realize the light source device 2 capable of emitting the plurality of colored light beams spatially separated from each other and uniformed in the polarization direction without using the polarization conversion element narrow in pitch described above. Thus, it is possible to reduce the light source device 2 in size, and by extension, it is possible to achieve reduction in size of the projector 1.

Further, in the projector 1 according to the present embodiment, since the green light beams enter the two sub-pixels SX2, SX3 out of the four sub-pixels SX in the light modulation device 6, it is possible to increase the light intensity of the green light entering the pixel PX. Thus, it is possible to increase the luminosity factor of the projection image.

Further, in the light source device 2 according to the present embodiment, there are provided the light source section 21 for emitting the first light beam BL having the blue wavelength band and including the blue light beam BLp as the P-polarization component and the blue light beam BLs as the S-polarization component, the first polarization split layer 221 which transmits the blue light beam BLp entering the first polarization split layer 221 along the +X direction from the light source section 21 toward the +X direction, and reflects the blue light beam BLs toward the −Z direction, the first optical layer 222 which is disposed at the +X direction side of the first polarization split layer 221, and transmits the blue light beam BLp entering the first optical layer 222 along the +X direction from the first polarization split layer 221 toward the +X direction, the second polarization split layer 231 which is disposed at the +X direction side of the first optical layer 222, and transmits the blue light beam BLp entering the second polarization split layer 231 along the +X direction from the first optical layer 222, the second optical layer 232 which is disposed at the +X direction side of the second polarization split layer 231, and reflects the blue light beam BLp entering the second optical layer 232 along the +X direction from the second polarization split layer 231 toward the −Z direction, the diffusion plate 261 which diffuses the blue light beam BLc1 entering the diffusion plate 261 along the −Z direction from the first polarization split layer 221, and emits the blue light beam BLc2 thus diffused toward an opposite direction to the −Z direction, the wavelength conversion element 28 which performs the wavelength conversion on the blue light beam BLp entering the wavelength conversion element 28 along the −Z direction from the second optical layer 232 to emit the yellow light beam YL having the yellow wavelength band toward the +Z direction, and the first color separation element 37 disposed at the +Z direction side of the first optical layer 222. The yellow light beam YL enters the second polarization split layer 231 along the +Z direction from the wavelength conversion element 28, the second polarization split layer 231 transmits the yellow light beam YLp toward the +Z direction, and reflects the yellow light beam YLs toward the −X direction, the second optical layer 232 transmits the yellow light beam YLp which enters the second optical layer 232 along the +Z direction from the second polarization split layer 231 toward the +Z direction, the first optical layer 222 reflects the yellow light beam YLs which enters the first optical layer 222 along the −X direction toward the +Z direction, the first polarization split layer 221 transmits the blue light beam BLc2 which is emitted from the diffusion plate 261 along the +Z direction, and then enters the first polarization split layer 221 toward the +Z direction, the first optical layer 222 transmits the blue light beam BLp which is emitted from the first polarization split layer 221 along the +Z direction, and then enters the first optical layer 222 toward the +Z direction, the first color separation element 37 separates the yellow light beam YLs which enters the first color separation element 37 along the +Z direction from the first optical layer 222 into the green light beam GLs and the red light beam RLs, and the red light beam RLs separated by the first color separation element 37 enters the wavelength conversion element 28.

According to the light source device 2 related to the present embodiment, by making the red light beam RLs separated from the yellow light beam YLs by the first color separation element 37 enter the wavelength conversion element 28, it is possible to emit the red light beam RLm as the unpolarized light from the wavelength conversion element 28 in addition to the yellow light beam YL. Similarly to the yellow light beam YLp, the red light beam RLp1 as the P-polarization component which is a part of the red light beam RLm as the unpolarized light is emitted toward the +Z direction from the second optical member 23.

In the case of the present embodiment, it is possible to take out the red light beam RLp1 as a part of the red light beam RLs4. In other words, since it is possible to reuse a part of the red component separated from the yellow light beam YL in the first color separation element 37 as the red light beam RLs4, it is possible to increase the light use efficiency of the red component. Therefore, it is possible to improve the color reproducibility of the red component of the projection image.

Further, in the light source device 2 according to the present embodiment, there is adopted the configuration in which the red light beam RLs reflected by the first color separation element 37 is reflected by each of the first optical layer 222 and the second polarization split layer 231 to thereby enter the wavelength conversion element 28.

According to this configuration, it is possible to surely make the red light component RLs separated from the yellow light beam YLs in the first color separation element 37 enter the wavelength conversion element 28. Thus, it is possible to increase the light use efficiency of the red light beam.

Further, in the light source device 2 according to the present embodiment, the second polarization split layer 231 has the configuration of separating the red light beam RLm emitted from the wavelength conversion element 28 into the red light beam RLs1 and the red light beam RLp1 as the P-polarization component. The second optical layer 232 is provided with the configuration in which the red light beam RLp1 which has been transmitted through the second polarization split layer 231 in the +Z direction is transmitted by the second optical layer 232 in the +Z direction.

According to this configuration, the red light beam RLp1 as the P-polarization component separated from the red light beam RLm can be taken out as the red light beam RLs4. Thus, by increasing the light intensity of the red light beam RLs4, it is possible to improve the color reproducibility of the projection image.

Further, in the light source device 2 according to the present embodiment, there is adopted the configuration further provided with the second retardation element 24 which is disposed between the first polarization split layer 221 and the diffusion plate 261, and which the blue light beam BLs enters along the −Z direction from the first polarization split layer 221.

According to this configuration, since the second retardation element 24 is disposed between the first optical member 22 and the first light collection element 25, it is possible to convert the blue light beam BLc2 as the circularly polarized light emitted from the diffusion device 26 into the blue light beam BLp as the P-polarization component to be transmitted through the first polarization split layer 221 of the first optical member 22. Thus, it is possible to increase the use efficiency of the blue light beam BLc2 emitted from the diffusion device 26.

Further, in the light source device 2 according to the present embodiment, the light source section 21 is provided with the configuration including the light emitting elements 211, and the third retardation element 2131 which the light emitted from the light emitting elements 211 enters, and which emits the first light beam BL.

According to this configuration, since the light source section 21 is provided with the third retardation element 2131, it is possible to surely make the blue light beam BLp as the P-polarization component and the blue light beam BLs as the S-polarization component enter the first optical member 22. Further, according to this configuration, since the polarization directions of the light beams emitted from the plurality of light emitting elements 211 are allowed to be the same, it is sufficient to dispose the same solid-state light sources in the same orientation, and thus, it is possible to simplify the configuration of the light source section 21.

Further, in the light source device 2 according to the present embodiment, there is adopted the configuration in which the third retardation element 2131 can rotate centering on the rotational axis extending along the proceeding direction of the light entering the third retardation element 2131.

According to this configuration, since the third retardation element 2131 is made capable of rotating around the rotational axis R2 extending along the +X direction, by adjusting the rotational angle of the third retardation element 2131, it is possible to adjust the ratio between the light intensity of the blue light beam BLs and the light intensity of the blue light beam BLp entering the first optical member 22. Thus, it is possible to adjust the ratio between the light intensity of the blue light beam BLs and the light intensity of the yellow light beam YLs, the green light beam GLs, and the red light beam RLs emitted from the light source device 2, and therefore, it is possible to adjust the white balance of the light source device 2.

Further, in the light source device 2 according to the present embodiment, there is adopted the configuration in which the first transparent plate 220 having the first surface 220a and the second surface 220b is further provided, and the first polarization split layer 221 is formed on the first surface 220a of the first transparent substrate 220, and the first optical layer 222 is formed on the second surface 220b of the first transparent substrate 220.

According to this configuration, by making use of the both surfaces of the first transparent substrate 220, it is possible to easily and accurately form the first polarization split layer 221 and the first optical layer 222.

Further, in the light source device 2 according to the present embodiment, there is adopted the configuration in which the second transparent substrate 230 having the third surface 230a and the fourth surface 230b is further provided, the third surface 230a of the second transparent substrate 230 and the second surface 220b of the first transparent substrate 220 are opposed to each other, the second polarization split layer 231 is formed on the third surface 230a of the second transparent substrate 230, and the second optical layer 232 is formed on the fourth surface 230b of the second transparent substrate 230.

According to this configuration, by making use of the both surfaces of the second transparent substrate 230, it is possible to easily and accurately form the second polarization split layer 231 and the second optical layer 232.

Further, in the light source device 2 according to the present embodiment, there is adopted the configuration in which the second optical layer 232 is the dichroic mirror which reflects the blue light beam BLp and transmits the yellow light beam YL.

According to this configuration, it is possible for the second optical layer 232 to achieve the accurate separation by reflecting or transmitting the incident light without using the polarization.

Further, in the light source device 2 according to the present embodiment, there is adopted the configuration in which the first optical layer 222 is the dichroic mirror which transmits the blue light beam BLp and reflects the yellow light beam YL.

According to this configuration, it is possible for the first optical layer 222 to achieve the accurate separation by reflecting or transmitting the incident light without using the polarization.

Further, in the light source device 2 according to the present embodiment, there is adopted the configuration further provided with the second color separation element 29 which is disposed at the +Z direction side of the first optical layer 222, and separates the light emitted from the first optical layer 222 into the blue light beam BLs having the blue wavelength band and the green light beam GLs having the green wavelength band, and the third color separation element 33 which is disposed at the +Z direction side of the second optical layer 232, and separates the light emitted from the second optical layer 232 into the green light beam GLs1 having the green wavelength band and the red light beam RLs4 having the red wavelength band.

According to this configuration, it is possible to emit the blue light beam BLs, the green light beam GLs, the green light beam GLs1, and the red light beam RLs4 from the light source device 2.

Further, in the case of the present embodiment, since the fifth retardation element 32 is disposed between the second optical member 23 and the third color separation element 33, it is possible to convert the yellow light beam YLp as the P-polarization component emitted from the second optical member 23 into the yellow light beam YLs1 as the S-polarization component. Thus, it is possible to convert the green light beam GLs1 and the red light beam RLs4 emitted from the third color separation element 33 into the light as the S-polarization component, and it is possible to uniform all of the blue light beam BLs, the green light beam GLs, the green light beam GLs1, and the red light beam RLs4 emitted from the light source device 2 into the light as the S-polarization component.

Further, in the case of the present embodiment, since the light source device 2 is provided with the first light collection element 25 for converging the blue light beam BLs toward the diffusion device 26, it is possible to efficiently converge the blue light beam BLc1 emitted from the second retardation element 24 on the diffusion device 26 with the first light collection element 25, and at the same time, it is possible to substantially collimate the blue light beam BLc2 emitted from the diffusion device 26. Thus, it is possible to suppress the loss of the blue light beam BLs to increase the use efficiency of the blue light beam BLs.

Further, in the case of the present embodiment, since the light source device 2 is provided with the second light collection element 27 for converging the blue light beam BLp toward the wavelength conversion element 28, it is possible to efficiently converge the blue light beam BLp emitted from the second optical member 23 on the wavelength conversion element 28 with the second light collection element 27, and at the same time, it is possible to collimate the yellow light beam YL emitted from the wavelength conversion element 28. Thus, it is possible to suppress the loss of the blue light beam BLp and the yellow light beam YL to increase the use efficiency of the blue light beam BLp and the yellow light beam YL.

Further, in the light source device 2 according to the present embodiment, there is adopted the configuration further provided with the first mirror 141, the second mirror 142, and the third mirror 143, wherein the first mirror 141 is disposed at the +Y direction side of the first transparent substrate 220 and the second transparent substrate 230, the second mirror 142 is disposed so as to be opposed to the first mirror 141, and is disposed at the −Y direction side of the first transparent substrate 220 and the second transparent substrate 230, and the third mirror 143 is disposed so as to cross the first transparent substrate 220 and the second transparent substrate 230 to couple the end part 141a at the +X direction side of the first mirror 141 and the end part 142a at the +X direction side of the second mirror 142 to each other.

As described above, although the blue light beam BLc2 emitted from the diffusion device 26 is substantially collimated by the first light collection element 25, some components thereof enter the first optical member 22 in a diverging state. Similarly, although the yellow light beam YL emitted from the wavelength conversion element 28 is substantially collimated by the second light collection element 27, some components thereof enter the second optical member 23 in a diverging state.

In contrast, in the case of the present embodiment, since there is provided the light tunnel 40 for holding the both sides of the first optical member 22 and the second optical member 23 in the Y direction, it is possible to take the light spreading in the Y direction in the first optical member 22 or the second optical member 23 by reflecting the light with the first mirror 141 and the second mirror 142. Further, it is possible to take the light spreading in the +X direction in the second optical member 23 by reflecting the light with the third mirror 143.

Thus, it is possible to efficiently take in the light which is emitted to the first optical member 22 of the plate type and the second optical member 23 of the plate type from the diffusion device 26 and the wavelength conversion element 28.

Further, in the case of the present embodiment, since the projector 1 is provided with the homogenization device 4 located between the light source device 2 and the light modulation device 6, it is possible to substantially homogenously irradiate the light modulation device 6 with the blue light beam BLs, the green light beam GLs, the green light beam GLs1, and the red light beam RLs4 emitted from the light source device 2. Thus, it is possible to suppress the color unevenness and the luminance unevenness in the projection image.

Further, in the case of the present embodiment, since the light modulation device 6 is provided with the microlens array 62 having the plurality of microlenses 621 corresponding to the plurality of pixels PX, it is possible to make the four colored light beams entering the light modulation device 6 enter the corresponding four sub-pixels SX of the liquid crystal panel 61 using the microlenses 621. Thus, it is possible to make the colored light beams emitted from the light source device 2 efficiently enter the respective sub-pixels SX, and thus, it is possible to increase the use efficiency of the colored light beams.

Second Embodiment

A second embodiment of the present disclosure will hereinafter be described using FIG. 10 and FIG. 11.

A light source device according to the second embodiment is substantially the same in basic configuration as in the first embodiment, but is different in configuration provided with a first retardation element from that in the first embodiment. Therefore, the description of the whole of the light source device will be omitted.

Figure 10:
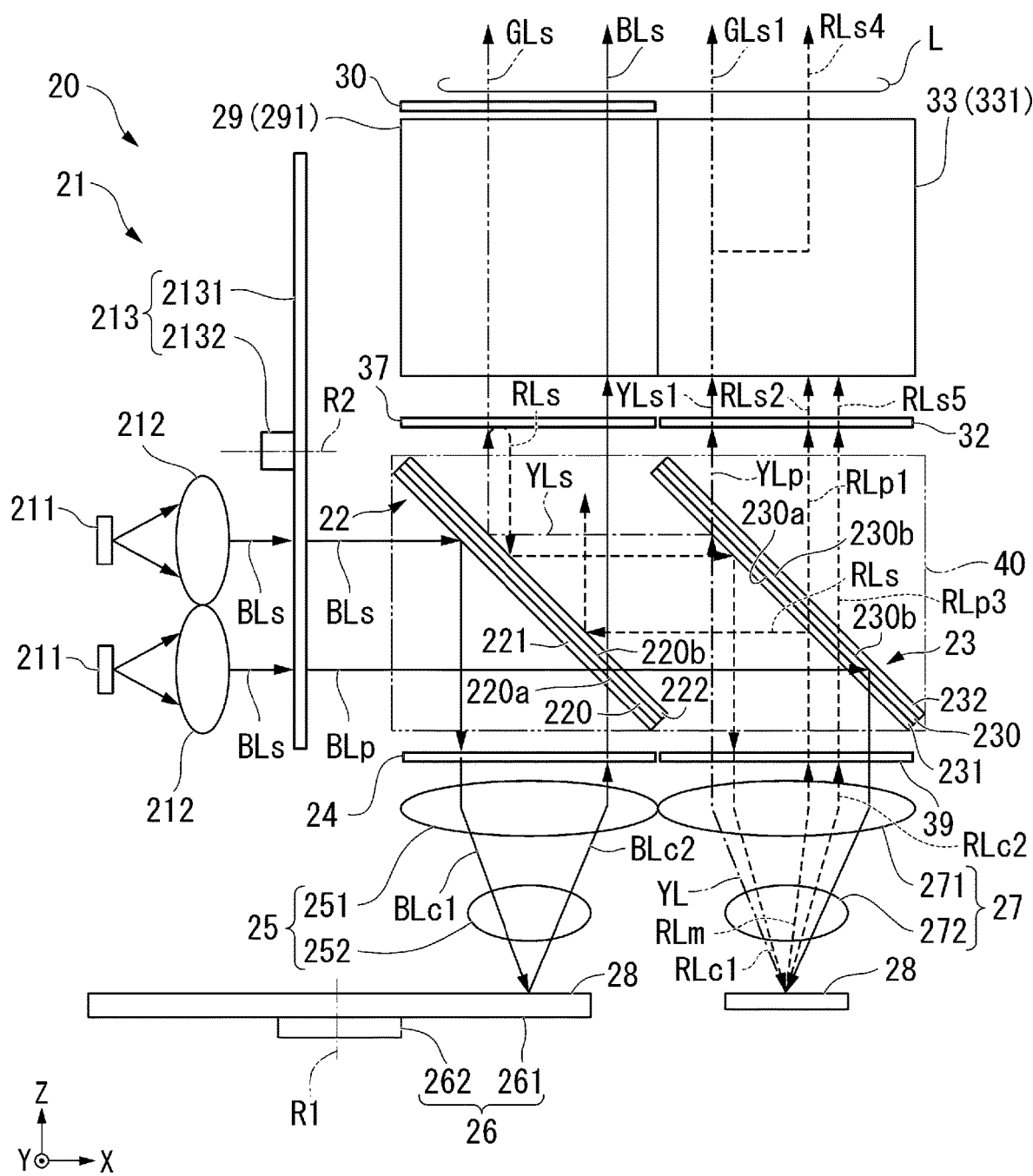
FIG. 10 is a plan view in an essential part of a light source device according to a second embodiment viewed from the +Y direction.

FIG. 10 is a plan view in an essential part of the light source device according to the second embodiment viewed from the +Y direction.

In FIG. 10, the constituents common to the drawing used in the first embodiment are denoted by the same reference symbols, and the description thereof will be omitted.

As shown in FIG. 10, the light source device 20 according to the present embodiment is provided with a first retardation element 39 disposed on the light path of the red light beam RLs1 between the second polarization split layer 231 and the wavelength conversion element 28 in the light source device 2 according to the first embodiment.

The red light beam RLs separated from the yellow light beam YLs in the first color separation element 37 is reflected by each of the first optical layer 222 and the second polarization split layer 231 to thereby enter the first retardation element 39.

The first retardation element 39 is formed of a ¼ wave plate with respect to the red wavelength band of the red light beam RLs which enters the ¼ wave plate. The first retardation element 39 is formed of a wavelength-selective retardation element which has a characteristic of providing a phase difference as much as ¼ of the red wavelength band to the red light, and not providing the phase difference to the light having a wavelength band other than the red wavelength band, namely the blue light and the green light. Specifically, as the wavelength-selective retardation element, it is possible to use ColorSelect® (trade name; product of ColorLink Inc.).

Thus, the first retardation element 39 provides the phase difference of ¼ only to the light in the red wavelength band. Specifically, the red light beam RLs is converted by the first retardation element 39 into, for example, the red light beam RLc1 as the clockwise circularly polarized light, and is then emitted toward the second light collection element 27. In other words, the first retardation element 39 converts the polarization state of the red light beam RLs which enters the first retardation element 39.

The red light beam RLc1 which has been converted by the first retardation element 39 into the clockwise circularly polarized light enters the wavelength conversion element 28.

Figure 11:
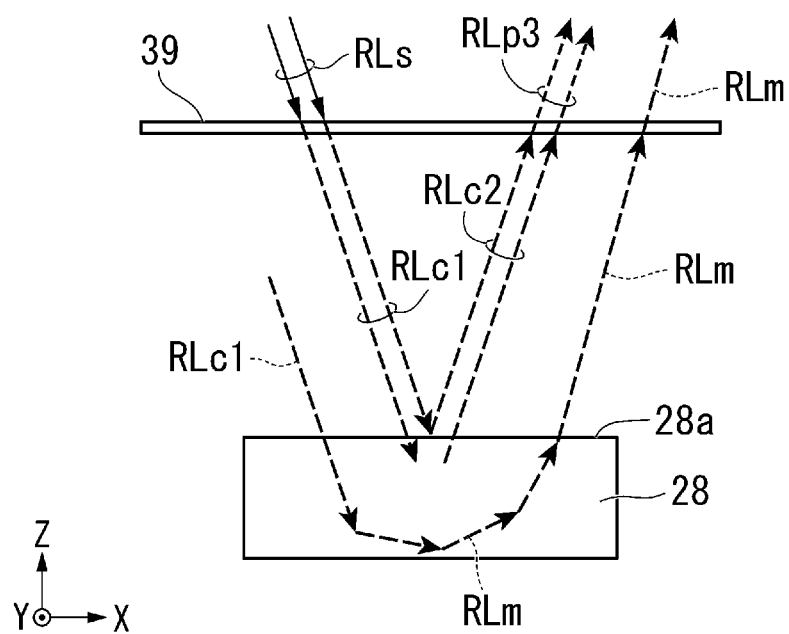
FIG. 11 is a schematic diagram showing a polarization state of a red light beam which enters a wavelength conversion element.

FIG. 11 is a schematic diagram showing the polarization state of the red light which is transmitted through the first retardation element 39 and then enters the wavelength conversion element 28. In FIG. 11, illustration of the second light collection element 27 is omitted in order to make the drawing eye-friendly.

As described above, the red light beam RLc1 having entered the wavelength conversion element 28 is repeatedly reflected inside the wavelength conversion element 28 to thereby be emitted as the red light beam RLm as unpolarized light including the S-polarized light and the P-polarized light mixed with each other.

In contrast, out of the red light beam RLc1 having entered the wavelength conversion element 28, the light reflected by the surface 28a of the wavelength conversion element 28, or the light back-scattered by the surface layer of the wavelength conversion element 28 is hardly disturbed in polarization. Therefore, as shown in FIG. 11, the red light beam RLc1 which has been surface-reflected, or back-scattered by the wavelength conversion element 28 is emitted from the wavelength conversion element 28 as the red light beam RLc2 as counterclockwise circularly polarized light. The red light beam RLc2 as the counterclockwise circularly polarized light passes the second light collection element 27 toward the +Z direction, and then enters the first retardation element 39 once again. On this occasion, the red light beam RLc2 which enters the first retardation element 39 from the second light collection element 27 is converted by the first retardation element 39 into the red light beam RLp3 as the P-polarization component. The red light beam RLp3 thus converted enters the second optical member 23.

The red light beam RLp3 as the P-polarization component having entered the second optical member 23 is transmitted through the second optical member 23 and then emitted toward the +Z direction similarly to the yellow light beam YLp, and is then converted into the red light beam RLs5 as the S-polarization component by the fifth retardation element 32. In other words, according to the light source device 20 related to the present embodiment, since the first retardation element 39 is provided, the red light beam RLs5 which has been surface-reflected or back-scattered by the wavelength conversion element 28 can be taken out to the outside as the red light.

It should be noted that the red light beam RLm emitted as the unpolarized light from the wavelength conversion element 28 is kept unpolarized when being transmitted through the first retardation element 39. Therefore, in the present embodiment, the amount of the red light beam RLm as the unpolarized light taken out to the outside is the same as in the first embodiment.

Advantages of Second Embodiment

Also in the present embodiment, it is possible to obtain substantially the same advantages as in the first embodiment such as the advantage that it is possible to realize the light source device 20 capable of emitting the plurality of colored light beams made uniform in polarization direction without using the polarization conversion element narrow in pitch, and the advantage that it is possible to achieve the reduction in size of the light source device 20 and the projector 1.

Further, in the light source device 20 according to the second embodiment, the red light beam RLp3 which has been emitted from the wavelength conversion element 28 with the polarization undisturbed can be taken out to the outside by the first retardation element 39 disposed between the second polarization split layer 231 and the wavelength conversion element 28. Thus, since it is possible to increase the light intensity of the red light beam RLs4 which enters the pixel PX compared to the light source device 2 according to the first embodiment, it is possible to further enhance the color reproducibility in the red light of the projection image.

Third Embodiment

A third embodiment of the present disclosure will hereinafter be described using FIG. 12.

The third embodiment is substantially the same in basic configuration of the light source device as in the first embodiment, but is different in configuration of the first optical member and position of the first color separation element with respect to the first optical member from those in the first embodiment. Therefore, the description of the whole of the light source device will be omitted.

Figure 12:
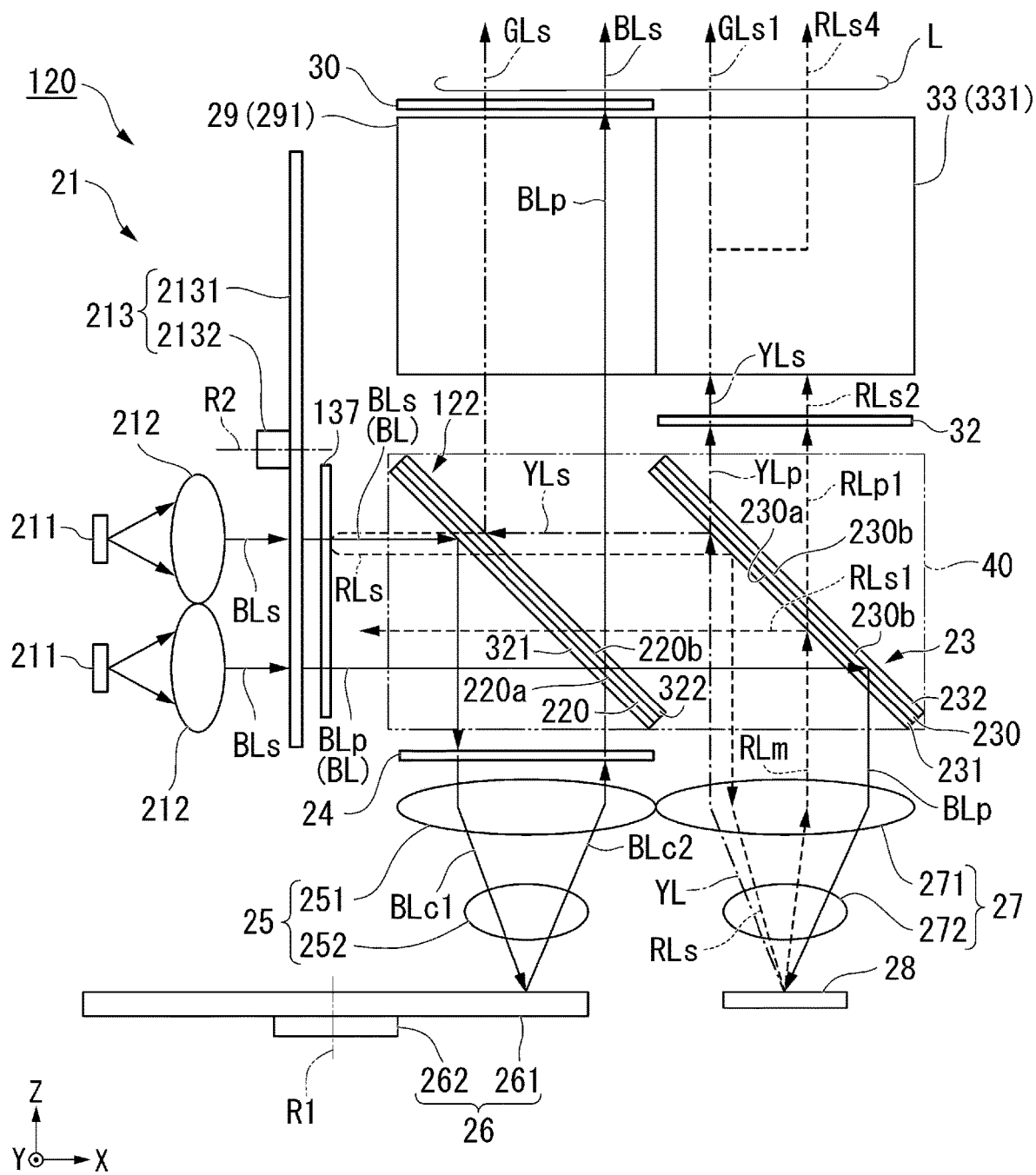
FIG. 12 is a plan view in an essential part of alight source device according to a third embodiment viewed from the +Y direction.

FIG. 12 is a plan view of the light source device according to the third embodiment viewed from the +Y direction.

In FIG. 12, the constituents common to the drawing used in the first embodiment are denoted by the same reference symbols, and the description thereof will be omitted.

As shown in FIG. 12, the light source device 120 according to the present embodiment has the light source section 21, a first optical member 122, the second optical member 23, the second retardation element 24, the first light collection element 25, the diffusion device 26, the second light collection element 27, the wavelength conversion element 28, a first color separation element 137, the second color separation element 29, the fourth retardation element 30, the fifth retardation element 32, the third color separation element 33, and the light tunnel 40.

The first optical member 122 in the present embodiment has the first transparent substrate 220, a first polarization split layer 321, and a first optical layer 322. The first polarization split layer 321 is provided to the first surface 220a of the first transparent substrate 220. Therefore, the first polarization split layer 321 is disposed so as to be opposed to the light source section 21, and at the same time, tilted 45° with respect to the X-Y plane and the Y-Z plane.

The first polarization split layer 321 has a polarization split characteristic of transmitting the P-polarized light and reflecting the S-polarized light with respect to the light in the blue wavelength band. Further, the first polarization split layer 321 has a characteristic of transmitting the S-polarized light with respect to the light in the red wavelength band. Therefore, the first optical member 122 transmits the blue light beam BLp as the P-polarization component along the +X direction, and reflects the blue light beam BLs as the S-polarization component toward the −Z direction out of the blue light beam which enters the first optical member 22 along the +X direction. The first polarization split layer 321 is formed of, for example, a dielectric multilayer film.

The first optical layer 322 is provided to the second surface 220b of the first transparent substrate 220. In other words, the first optical layer 322 is disposed at the +X direction side of the first polarization split layer 321. The first optical layer 322 has a characteristic of transmitting the P-polarization component in the light in the blue wavelength band and the light in the red wavelength band, and reflecting the S-polarization component out of the light in the green wavelength band. Specifically, the first optical layer 322 in the present embodiment is formed of a dichroic mirror which reflects the light in the green wavelength band and transmits the light in the rest of the wavelength band.

Therefore, the blue light beam BLp as the P-polarization component which enters the first optical layer 322 from the first polarization split layer 321 along the +X direction is transmitted by the first optical layer 322 in the +X direction.

According to the first optical member 122 having the configuration described above, it is possible to separate the first light beam BL having been emitted from the light source section 21 into the blue light beam BLp as the P-polarization component and the blue light beam BLs as the S-polarization component, transmit the blue light BLp as the P-polarization component in the +X direction to thereby make the blue light beam BLp enter the second optical member 23, and reflect the blue light beam BLs as the S-polarization component in the −Z direction to make the blue light beam BLs enter the diffusion device 26.

Since the first optical member 122 in the present embodiment is the plate type polarization split element, it is possible to separately design a function of the first polarization split layer 321 to be formed on the first surface 220a of the first transparent substrate 220 and a function of the first optical layer 322 to be formed on the second surface 220b of the first transparent substrate 220. Therefore, the film design of the first polarization split layer 321 and the first optical layer 322 becomes relatively easy.

In the first optical member 122 in the present embodiment, the yellow light beam YLs emitted from the second optical member 23 enters the first optical layer 322. The first optical layer 322 reflects the green light beam GLs toward the +Z direction, and transmits the red light beam RLs toward the −X direction.

The red light beam RLs is transmitted through the first transparent substrate 220 to enter the first polarization split layer 321. The first polarization split layer 321 transmits the red light beam RLs which enters the first polarization split layer 321 in the −X direction from the first optical layer 322. It should be noted that the green light beam GLs is light having the green wavelength band out of the wavelength band of the yellow light beam YLs, and the red light beam RLs is light having the red wavelength band out of the wavelength band of the yellow light beam YLs.

The first optical member 122 in the present embodiment emits the green light beam GLs toward the +Z direction, and emits the red light beam RLs along the −X direction.

The green light beam GLs in the present embodiment corresponds to the third light beam having the third wavelength band different from the second wavelength band in the appended claims. Further, the red light beam RLs in the present embodiment corresponds to the fourth light beam having the fourth wavelength band different from the third wavelength band in the appended claims.

The first color separation element 137 in the present embodiment is disposed at the −X direction side of the first optical member 122. In other words, the first color separation element 137 is disposed between the light source section 21 and the first optical member 122.

The first color separation element 137 is formed of a dichroic mirror having a characteristic of transmitting light in the blue wavelength band while reflecting light in the red wavelength band. Therefore, the first color separation element 137 transmits the first light beam BL in the blue wavelength band emitted from the light source section 21 toward the +X direction, and at the same time, reflects the red light beam RLs which enters first color separation element 137 along the −X direction from the first optical layer 322 of the first optical member 122 toward the +X direction. The red light beam RLs reflected by the first color separation element 137 is transmitted through the first optical member 122, and is then reflected by the second polarization split layer 231 of the second optical member 23 to thereby enter the wavelength conversion element 28.

It is possible for the first color separation element 137 in the present embodiment to separate the red light beam RLs included in the yellow light beam YLs to make the red light beam RLs enter the wavelength conversion element 28 in cooperation with the first optical layer 322 of the first optical member 122.

Also in the light source device 120 according to the present embodiment, the red light beam RLs having entered the wavelength conversion element 28 is emitted outside the wavelength conversion element 28 together with the yellow light beam YL as the red light beam RLm as the unpolarized light.

Similarly to the yellow light beam YLp, the red light beam RLm as the unpolarized light having entered the second optical member 23 is separated by the second polarization split layer 231 into the red light beam RLp1 as the P-polarization component and the red light beam RLs1 as the S-polarization component. In other words, the red light beam RLs1 as the S-polarization component enters the first color separation element 137 via the second polarization split layer 231 and the first optical member 122, and is then reflected by the first color separation element 137 to thereby return to the wavelength conversion element 28 once again. Further, the red light beam RLp1 as the P-polarization component which has been transmitted through the second polarization split layer 231 in the +Z direction is transmitted and then emitted by the second optical layer 232 toward the +Z direction.

In the present embodiment, the red light beam RLm as the unpolarized light corresponds to the fourth light beam emitted from the wavelength conversion element in the appended claims. Further, the red light beam RLp1 as the P-polarization component corresponds to the light polarized in the first polarization direction in the appended claims. Further, the red light beam RLs1 as the S-polarization component corresponds to the light polarized in the second polarization direction in the appended claims.

Advantages of Third Embodiment

In the light source device 120 according to the present embodiment, there are provided the light source section 21 for emitting the first light beam BL having the blue wavelength band and including the blue light beam BLp as the P-polarization component and the blue light beam BLs as the S-polarization component, the first polarization split layer 321 which transmits the blue light beam BLp entering the first polarization split layer 321 along the +X direction from the light source section 21 toward the +X direction, and reflects the blue light beam BLs toward the −Z direction, the first optical layer 322 which is disposed at the +X direction side of the first polarization split layer 321, and transmits the blue light beam BLp entering the first optical layer 322 along the +X direction from the first polarization split layer 321 toward the +X direction, the second polarization split layer 231 which is disposed at the +X direction side of the first optical layer 222, and transmits the blue light beam BLp entering the second polarization split layer 231 along the +X direction from the first optical layer 322, the second optical layer 232 which is disposed at the +X direction side of the second polarization split layer 231, and reflects the blue light beam BLp entering the second optical layer 232 along the +X direction from the second polarization split layer 231 toward the −Z direction, the diffusion plate 261 which diffuses the blue light beam BLc1 entering the diffusion plate 261 along the −Z direction from the first polarization split layer 321, and emits the blue light beam BLc2 thus diffused toward an opposite direction to the −Z direction, the wavelength conversion element 28 which performs the wavelength conversion on the blue light beam BLp entering the wavelength conversion element 28 along the −Z direction from the second optical layer 232 to emit the yellow light beam YL having the yellow wavelength band toward the +Z direction, and the first color separation element 137 disposed at the −X direction side of the first polarization split layer 321.

The yellow light beam YL enters the second polarization split layer 231 along the +Z direction from the wavelength conversion element 28, the second polarization split layer 231 transmits the yellow light beam YLp toward the +Z direction, and reflects the yellow light beam YLs toward the −X direction, the second optical layer 232 transmits the yellow light beam YLp which enters the second optical layer 232 along the +Z direction from the second polarization split layer 231 toward the +Z direction, the yellow light beam YLs enters the first optical layer 322 along the −X direction, the first optical layer 322 separates the yellow light beam YLs into the green light beam GLs and the red light beam RLs, the first polarization split layer 321 transmits the blue light beam BLc2 which is emitted from the diffusion plate 261 along the +Z direction, and then enters the first polarization split layer 321 toward the +Z direction, and transmits the red light beam RLs which enters the first polarization split layer 321 in the −X direction from the first optical layer 322, the first optical layer 322 transmits the blue light beam BLp which is emitted from the first polarization split layer 321 along the +Z direction, and then enters the first optical layer 322 toward the +Z direction, the first color separation element 137 transmits the first light beam BL emitted from the light source section 21 toward the +X direction, and at the same time, reflects the red light beam RLs which enters the first color separation element 137 in the −X direction from the first polarization split layer 321 toward the +X direction, and the red light beam RLs reflected by the first color separation element 137 enters the wavelength conversion element 28.

Also in the light source device 120 according to the present embodiment, it is possible to obtain substantially the same advantages as in the first embodiment such as the advantage that it is possible to realize the light source device 120 capable of emitting the plurality of colored light beams made uniform in polarization direction without using the polarization conversion element narrow in pitch, and the advantage that it is possible to achieve the reduction in size of the light source device 120 and the projector 1.

Further, according to the light source device 120 related to the present embodiment, by making the red light beam RLs separated from the yellow light beam YLs by the first optical layer 322 return to the wavelength conversion element 28 side by the first color separation element 137, it is possible to emit the red light beam RLm as the unpolarized light from the wavelength conversion element 28 in addition to the yellow light beam YL. In other words, similarly to the first embodiment, it is possible to reuse a part of the red component separated from the yellow light beam YL in the first color separation element 137 as the red light beam RLs4. Therefore, the light use efficiency of the red component increases, and the color reproducibility of the red component of the projection image is enhanced.

Fourth Embodiment

A fourth embodiment of the present disclosure will hereinafter be described using FIG. 13.

A light source device according to the fourth embodiment is substantially the same in basic configuration as in the third embodiment, but is different in configuration provided with the first retardation element from that in the third embodiment. Therefore, the description of the whole of the light source device will be omitted. The relationship between the present embodiment and the third embodiment is common to the relationship between the first embodiment and the second embodiment.

Figure 13:
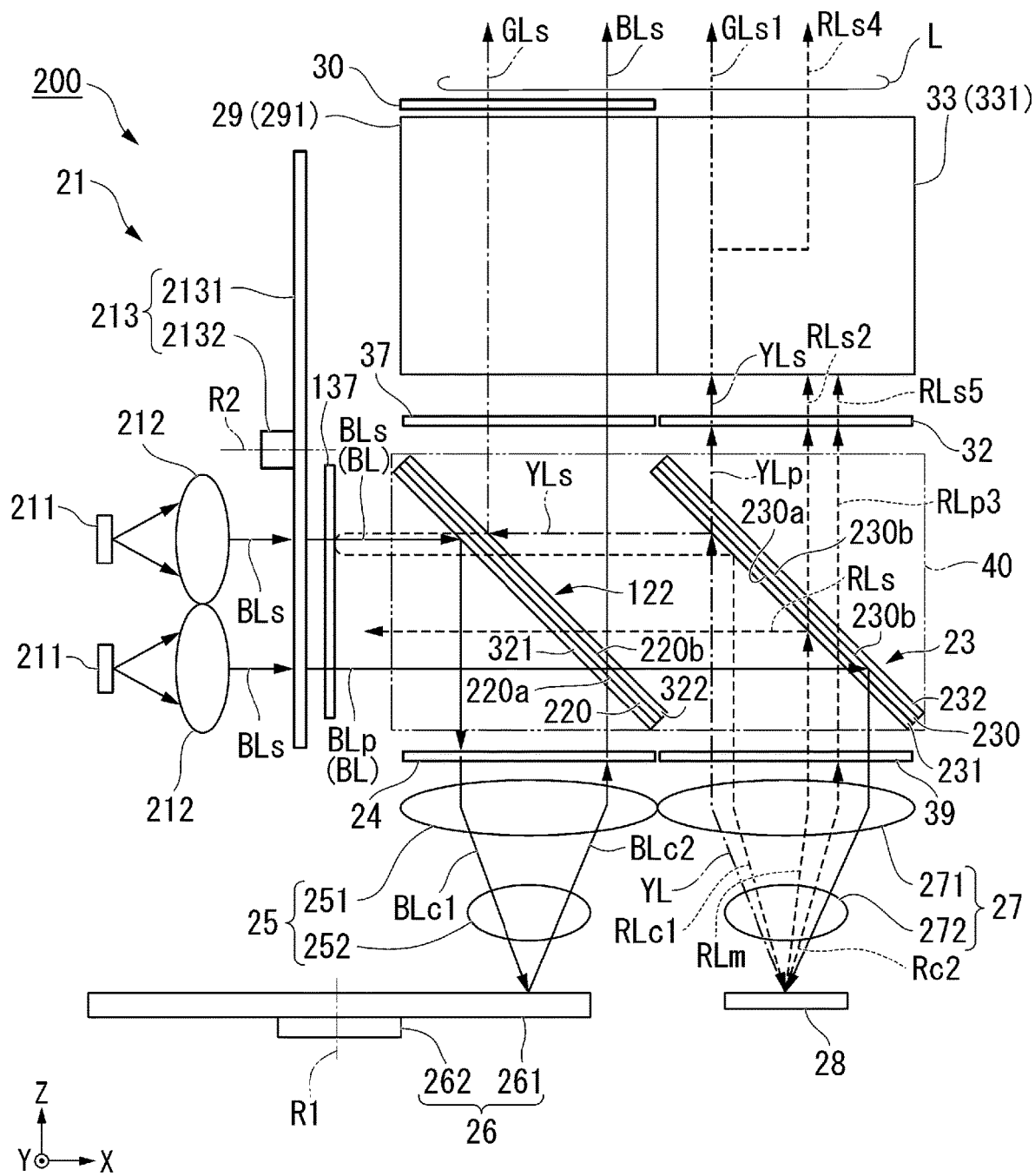
FIG. 13 is a plan view in an essential part of alight source device according to a fourth embodiment viewed from the +Y direction.

FIG. 13 is a plan view in an essential part of the light source device according to the fourth embodiment viewed from the +Y direction.

In FIG. 13, the constituents common to the drawing used in the second embodiment and the third embodiment are denoted by the same reference symbols, and the description thereof will be omitted.

As shown in FIG. 13, the light source device 200 according to the present embodiment is provided with the first retardation element 39 disposed on the light path of the red light beam RLs1 between the second polarization split layer 231 and the wavelength conversion element 28 in the light source device 120 according to the third embodiment.

The red light beam RLs separated from the yellow light beam YLs in the first color separation element 37 is reflected by each of the first optical layer 222 and the second polarization split layer 231 to thereby enter the first retardation element 39.

The first retardation element 39 is formed of the ¼ wave plate with respect to the red wavelength band of the red light beam RLs which enters the ¼ wave plate. The red light beam RLs is converted by the first retardation element 39 into, for example, the red light beam RLc1 as the clockwise circularly polarized light, and is then emitted toward the second light collection element 27. In other words, the first retardation element 39 converts the polarization state of the red light beam RLs which enters the first retardation element 39.

The red light beam RLc1 which has been converted by the first retardation element 39 into the clockwise circularly polarized light enters the wavelength conversion element 28.

The red light beam RLc1 which has been surface-reflected, or back-scattered by the wavelength conversion element 28 out of the red light beam RLc1 having entered the wavelength conversion element 28 is emitted from the wavelength conversion element 28 as the red light beam RLc2 as the counterclockwise circularly polarized light. The red light beam RLc2 as the counterclockwise circularly polarized light passes the second light collection element 27 toward the +Z direction, and is then transmitted through the first retardation element 39 once again to thereby be converted into the red light beam RLp3 as the P-polarization component. The red light beam RLp3 thus converted enters the second optical member 23.

Similarly to the yellow light beam YLp, the red light beam RLp3 as the P-polarization component having entered the second optical member 23 is transmitted through the second optical member 23 to be emitted toward the +Z direction. In other words, according to the light source device 200 related to the present embodiment, by adding the first retardation element 39 to the configuration in the third embodiment, the red light beam RLc2 which has been surface-reflected or back-scattered by the wavelength conversion element 28 can be taken out to the outside.

It should be noted that the red light beam RLm emitted as the unpolarized light from the wavelength conversion element 28 is kept unpolarized when being transmitted through the first retardation element 39. Therefore, in the present embodiment, the amount of the red light beam RLm as the unpolarized light taken out to the outside is the same as in the third embodiment.

Advantages of Fourth Embodiment

Also in the present embodiment, it is possible to obtain substantially the same advantages as in the first embodiment such as the advantage that it is possible to realize the light source device 200 capable of emitting the plurality of colored light beams made uniform in polarization direction without using the polarization conversion element narrow in pitch, and the advantage that it is possible to achieve the reduction in size of the light source device 200 and the projector 1.

Further, in the light source device 200 according to the fourth embodiment, the red light beam RLp3 which has been emitted from the wavelength conversion element 28 with the polarization undisturbed can be taken out to the outside by the first retardation element 39 disposed between the second polarization split layer 231 and the wavelength conversion element 28. Thus, since it is possible to increase the light intensity of the red light beam RLs4 which enters the pixel PX compared to the light source device 120 according to the third embodiment, it is possible to further enhance the color reproducibility in the red light of the projection image.

It should be noted that the scope of the present disclosure is not limited to the embodiments described above, but a variety of modifications can be provided thereto within the scope or the spirit of the present disclosure.

For example, in the embodiments described above, the first polarization split layer and the first optical layer are disposed on two surfaces of a single light transmissive substrate. Instead of this configuration, it is possible for the first polarization split layer and the first optical layer to be provided to respective light transmissive substrates different from each other. For example, it is possible to adopt a configuration in which the first polarization split layer is disposed on a first surface of a first light transmissive substrate, an antireflection layer is disposed on a second surface different from the first surface of the first light transmissive substrate, the first optical layer is disposed on a third surface of a second light transmissive substrate, an antireflection layer is disposed on a fourth surface different from the third surface of the second light transmissive substrate, and the first polarization split layer and the first optical layer are disposed so as to be opposed to each other. Similarly, the second polarization split layer and the second optical layer can be provided to respective light transmissive substrates different from each other.

The light source devices 2, 20, 120, and 200 according to the embodiments described above are each provided with the first light collection element 25 and the second light collection element 27. However, this configuration is not a limitation, but at least one of the first light collection element 25 and the second light collection element 27 is not required to be disposed.

The light source section 21 in each of the embodiments described above emits the blue light beams BLs, BLp in the +X direction. However, this is not a limitation, and it is also possible to adopt a configuration in which the light source section 21 emits the blue light beams BLs, BLp in a direction crossing the +X direction, and the blue light beams BLs, BLp are reflected using, for example, a reflecting member, and are then made to enter the first optical member 22 in the +X direction.

The projector according to each of the embodiments described above is provided with the homogenization device 4 having the first multi-lens 41, the second multi-lens 42, and the superimposing lens 43. It is possible to dispose a homogenization device having other configurations instead of this configuration, or it is not required to dispose the homogenization device 4.

The light source devices 2, 20, 120, and 200 according to the embodiments described above each emit the colored light beams from the four exit positions, respectively, and the liquid crystal panel 61 constituting the light modulation device 6 has the four sub-pixels SX in each of the pixels PX. Instead of this configuration, it is possible to adopt a configuration in which the light source devices 2, 20, 120, and 200 each emit three colored light beams, and the liquid crystal panel has three sub-pixels in each pixel. In this case, for example, in the light source devices according to the embodiments described above, a total reflection member can be disposed in the light path of the green light beam GLs.

The light source devices 2, 20, 120, and 200 according to the embodiments described above each emit the blue light beam BLs, the green light beam GLs, the green light beam GLs1, and the red light beam RLs4 which are each S-polarized light, and are spatially separated from each other. Instead of these configurations, the polarization state of the colored light beams emitted by the light source device can be another polarization state. For example, it is possible for the light source device to have a configuration of emitting a plurality of colored light beams which are each P-polarized light, and are spatially separated from each other.

Besides the above, the specific descriptions of the shape, the number, the arrangement, the material, and so on of the constituents of the light source device and the projector are not limited to those of the embodiments described above, but can arbitrarily be modified. Further, although in the embodiments described above, there is described the example of installing the light source device according to the present disclosure in the projector, the example is not a limitation. The light source device according to an aspect of the present disclosure can also be applied to lighting equipment, a headlight of a vehicle, and so on.

A light source device according to an aspect of the present disclosure may have the following configuration.

The light source device according to an aspect of the present disclosure includes a light source section configured to emit a first light beam which has a first wavelength band and includes light polarized in a first polarization direction and light polarized in a second polarization direction different from the first polarization direction, a first polarization split layer which is configured to transmit the first light beam entering the first polarization split layer from the light source section along a first direction and polarized in the first polarization direction toward the first direction, and reflect the first light beam polarized in the second polarization direction toward a second direction crossing the first direction, a first optical layer disposed at the first direction side of the first polarization split layer, and configured to transmit the first light beam which enters the first optical layer along the first direction from the first polarization split layer, and is polarized in the first polarization direction toward the first direction, a second polarization split layer disposed at the first direction side of the first optical layer, and configured to transmit the first light beam which enters the second polarization split layer along the first direction from the first optical layer, and is polarized in the first polarization direction, a second optical layer disposed at the first direction side of the second polarization split layer, and configured to reflect the first light beam which enters the second optical layer along the first direction from the second polarization split layer, and is polarized in the first polarization direction toward the second direction, a diffusion element configured to diffuse the first light beam entering the diffusion element along the second direction from the first polarization split layer, and configured to emit the first light beam diffused toward a third direction as an opposite direction to the second direction, a wavelength conversion element configured to perform wavelength conversion on the first light beam which enters the wavelength conversion element along the second direction from the second optical layer, and is polarized in the first polarization direction, and configured to emit a second light beam having a second wavelength band different from the first wavelength band toward the third direction, and a first color separation element disposed at the third direction side of the first optical layer, wherein the second light beam enters the second polarization split layer along the third direction from the wavelength conversion element, the second polarization split layer transmits the second light beam polarized in the first polarization direction toward the third direction, and reflects the second light beam polarized in the second polarization direction toward a fourth direction as an opposite direction to the first direction, the second optical layer transmits the second light beam which enters the second optical layer along the third direction from the second polarization split layer and is polarized in the first polarization direction toward the third direction, the first optical layer reflects the second light beam which enters the first optical layer along the fourth direction and is polarized in the second polarization direction toward the third direction, the first polarization split layer transmits the first light beam which is emitted along the third direction from the diffusion element and enters the first polarization split layer toward the third direction, the first optical layer transmits the first light beam which is emitted along the third direction from the first polarization split layer and enters the first optical layer toward the third direction, the first color separation element separates the second light beam which enters the first color separation element along the third direction from the first optical layer and is polarized in the second polarization direction into a third light beam having a third wavelength band different from the second wavelength band, and a fourth light beam having a fourth wavelength band different from the second wavelength band and the third wavelength band, and the fourth light beam separated by the first color separation element enters the wavelength conversion element.

In the light source device according to the aspect of the present disclosure, there may be adopted a configuration in which the fourth light beam reflected by the first color separation element is reflected by each of the first optical layer and the second polarization split layer to thereby enter the wavelength conversion element.

In the light source device according to the aspect of the present disclosure, there may be adopted a configuration in which the second polarization split layer separates the fourth light beam emitted from the wavelength conversion element into light polarized in the first polarization direction and light polarized in the second polarization direction.

In the light source device according to the aspect of the present disclosure, there may be adopted a configuration in which the second optical layer transmits the fourth light beam which is transmitted through the second polarization split layer in the third direction, and is polarized in the first polarization direction toward the third direction.

In the light source device according to the aspect of the present disclosure, there may be adopted a configuration further including a first retardation element which is disposed on a light path of the fourth light beam between the second polarization split layer and the wavelength conversion element, and is configured to provide a phase difference of ¼ to the fourth light beam.

A light source device according to another aspect of the present disclosure includes a light source section configured to emit a first light beam which has a first wavelength band and includes light polarized in a first polarization direction and light polarized in a second polarization direction different from the first polarization direction, a first polarization split layer which is configured to transmit the first light beam entering the first polarization split layer from the light source section along a first direction and polarized in the first polarization direction toward the first direction, and reflect the first light beam polarized in the second polarization direction toward a second direction crossing the first direction, a first optical layer disposed at the first direction side of the first polarization split layer, and configured to transmit the first light beam which enters the first optical layer along the first direction from the first polarization split layer, and is polarized in the first polarization direction toward the first direction, a second polarization split layer disposed at the first direction side of the first optical layer, and configured to transmit the first light beam which enters the second polarization split layer along the first direction from the first optical layer, and is polarized in the first polarization direction, a second optical layer disposed at the first direction side of the second polarization split layer, and configured to reflect the first light beam which enters the second optical layer along the first direction from the second polarization split layer, and is polarized in the first polarization direction toward the second direction, a diffusion element configured to diffuse the first light beam entering the diffusion element along the second direction from the first polarization split layer, and configured to emit the first light beam diffused toward a third direction as an opposite direction to the second direction, a wavelength conversion element configured to perform wavelength conversion on the first light beam which enters the wavelength conversion element along the second direction from the second optical layer, and is polarized in the first polarization direction, and configured to emit a second light beam having a second wavelength band different from the first wavelength band toward the third direction, and a first color separation element disposed at a fourth direction side of the first polarization split layer, the fourth direction being an opposite direction to the first direction, wherein the second light beam enters the second polarization split layer along the third direction from the wavelength conversion element, the second polarization split layer transmits the second light beam polarized in the first polarization direction toward the third direction, and reflects the second light beam polarized in the second polarization direction toward the fourth direction, the second optical layer transmits the second light beam which enters the second optical layer along the third direction from the second polarization split layer and is polarized in the first polarization direction toward the third direction, the second light beam polarized in the second polarization direction enters the first optical layer along the fourth direction, the first optical layer separates the second light beam polarized in the second polarization direction into a third light beam having a third wavelength band different from the second wavelength band, and a fourth light beam having a fourth wavelength band different from the second wavelength band and the third wavelength band, the first polarization split layer transmits the first light beam which is emitted along the third direction from the diffusion element and enters the first polarization split layer toward the third direction, and transmits the fourth light beam which enters the first polarization split layer in the fourth direction from the first optical layer, the first optical layer transmits the first light beam which is emitted along the third direction from the first polarization split layer and enters the first optical layer toward the third direction, the first color separation element transmits the first light beam emitted from the light source section toward the first direction, and reflects the fourth light beam which enters the first color separation element in the fourth direction from the first polarization split layer and has the fourth wavelength band toward the first direction, and the fourth light beam reflected by the first color separation element enters the wavelength conversion element.

In the light source device according to the aspect of the present disclosure, there may be adopted a configuration in which the first polarization split layer and the first optical layer transmit the fourth light beam having the fourth wavelength band, and the second polarization split layer reflects the fourth light beam which is reflected by the first color separation element and is transmitted through the first polarization split layer and the first optical layer toward the second direction to make the fourth light beam enter the wavelength conversion element.

In the light source device according to the aspect of the present disclosure, there may be adopted a configuration in which the second polarization split layer separates the fourth light beam reflected by the wavelength conversion element into light polarized in the first polarization direction and light polarized in the second polarization direction.

In the light source device according to the aspect of the present disclosure, there may be adopted a configuration in which the second optical layer transmits the fourth light beam which is transmitted through the second polarization split layer in the third direction, and is polarized in the first polarization direction toward the third direction.

In the light source device according to the aspect of the present disclosure, there may be adopted a configuration further including a first retardation element which is disposed on a light path of the fourth light beam between the second polarization split layer and the wavelength conversion element, and is configured to provide a phase difference of ¼ to the fourth light beam.

In the light source device according to the aspect of the present disclosure, there may be adopted a configuration further including a second retardation element which is disposed between the first polarization split layer and the diffusion element, and which the first light beam polarized in the second polarization direction enters along the second direction from the first polarization split layer.

In the light source device according to the aspect of the present disclosure, there may be adopted a configuration in which the light source section includes a light emitting element configured to emit light in the first wavelength band, and a third retardation element which the light emitted from the light emitting element enters, and which emits the first light beam.

In the light source device according to the aspect of the present disclosure, there may be adopted a configuration in which the third retardation element is made rotatable around a rotational axis along a proceeding direction of light entering the third retardation element.

In the light source device according to the aspect of the present disclosure, there may be adopted a configuration further including a first transparent substrate having a first surface and a second surface facing to an opposite direction to the first surface, wherein the first polarization split layer is provided to the first surface of the first transparent substrate, and the first optical layer is provided to the second surface of the first transparent substrate.

In the light source device according to the aspect of the present disclosure, there may be adopted a configuration further including a second transparent substrate having a third surface and a fourth surface facing to an opposite direction to the third surface, wherein the third surface of the second transparent substrate and the second surface of the first transparent substrate are opposed to each other, the second polarization split layer is provided to the third surface of the second transparent substrate, and the second optical layer is provided to the fourth surface of the second transparent substrate.

In the light source device according to the aspect of the present disclosure, there may be adopted a configuration in which there are further included a first mirror disposed at a fifth direction side of the first transparent substrate and the second transparent substrate, the fifth direction crossing the first direction, the second direction, the third direction, and the fourth direction, a second mirror disposed so as to be opposed to the first mirror, and disposed at a sixth direction side of the first transparent substrate and the second transparent substrate, the sixth direction being an opposite direction to the fifth direction, and a third mirror which is disposed so as to cross the first transparent substrate and the second transparent substrate, and couples an end part in the first direction of the first mirror and an end part in the first direction of the second mirror to each other.

In the light source device according to the aspect of the present disclosure, there may be adopted a configuration in which the second optical layer is a dichroic mirror configured to reflect the first light beam and transmit the second light beam.

In the light source device according to the aspect of the present disclosure, there may be adopted a configuration in which the first optical layer is a dichroic mirror configured to transmit the first light beam and reflect the second light beam.

In the light source device according to the aspect of the present disclosure, there may be adopted a configuration in which there are further included a second color separation element disposed at the third direction side of the first optical layer, and configured to separate light emitted from the first optical layer into a fifth light beam having the first wavelength band and a sixth light beam having the third wavelength band, and a third color separation element disposed at the third direction side of the second optical layer, and configured to separate light emitted from the second optical layer into a seventh light beam having the third wavelength band and an eighth light beam having the fourth wavelength band.

A projector according to still another aspect of the present disclosure may have the following configuration.

The projector according to the aspect of the present disclosure includes the light source device according to the aspect of the present disclosure, a light modulation device configured to modulate light from the light source device in accordance with image information, and a projection optical device configured to project the light modulated by the light modulation device.

In the projector according to the above aspect of the present disclosure, there may be adopted a configuration further including a homogenization device disposed between the light source device and the light modulation device, wherein the homogenization device includes a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

In the projector according to the above aspect of the present disclosure, there may be adopted a configuration in which the light modulation device includes a liquid crystal panel having a plurality of pixels, and a microlens array which is disposed at a light incident side of the liquid crystal panel, and has a plurality of microlenses corresponding to the plurality of pixels, the pixels each include a first sub-pixel, a second sub-pixel, a third sub-pixel, and a fourth sub-pixel, and the microlens makes the fifth light beam enter the first sub-pixel, makes the sixth light beam enter the second sub-pixel, makes the seventh light beam enter the third sub-pixel, and makes the eighth light beam enter the fourth sub-pixel.

What is claimed is:

1. A light source device comprising:
a light source section configured to emit a first light beam which has a first wavelength band and includes light polarized in a first polarization direction and light polarized in a second polarization direction different from the first polarization direction;
a first polarization split layer which is configured to transmit the first light beam entering the first polarization split layer from the light source section along a first direction and polarized in the first polarization direction toward the first direction, and is configured to reflect the first light beam polarized in the second polarization direction toward a second direction crossing the first direction;
a first optical layer disposed at the first direction side of the first polarization split layer, and configured to transmit the first light beam which enters the first optical layer along the first direction from the first polarization split layer, and is polarized in the first polarization direction toward the first direction;
a second polarization split layer disposed at the first direction side of the first optical layer, and configured to transmit the first light beam which enters the second polarization split layer along the first direction from the first optical layer, and is polarized in the first polarization direction;
a second optical layer disposed at the first direction side of the second polarization split layer, and configured to reflect the first light beam which enters the second optical layer along the first direction from the second polarization split layer, and is polarized in the first polarization direction toward the second direction;
a diffusion element configured to diffuse the first light beam entering the diffusion element along the second direction from the first polarization split layer, and configured to emit the first light beam diffused toward a third direction as an opposite direction to the second direction;
a wavelength conversion element configured to perform wavelength conversion on the first light beam which enters the wavelength conversion element along the second direction from the second optical layer, and is polarized in the first polarization direction, and configured to emit a second light beam having a second wavelength band different from the first wavelength band toward the third direction; and
a first color separation element disposed at the third direction side of the first optical layer, wherein
the second light beam enters the second polarization split layer along the third direction from the wavelength conversion element, the second polarization split layer transmits the second light beam polarized in the first polarization direction toward the third direction, and reflects the second light beam polarized in the second polarization direction toward a fourth direction as an opposite direction to the first direction,
the second optical layer transmits the second light beam which enters the second optical layer along the third direction from the second polarization split layer and is polarized in the first polarization direction toward the third direction, the first optical layer reflects the second light beam which enters the first optical layer along the fourth direction and is polarized in the second polarization direction toward the third direction,
the first polarization split layer transmits the first light beam which is emitted along the third direction from the diffusion element and enters the first polarization split layer toward the third direction,
the first optical layer transmits the first light beam which is emitted along the third direction from the first polarization split layer and enters the first optical layer toward the third direction,
the first color separation element separates the second light beam which enters the first color separation element along the third direction from the first optical layer and is polarized in the second polarization direction into a third light beam having a third wavelength band different from the second wavelength band, and a fourth light beam having a fourth wavelength band different from the second wavelength band and the third wavelength band, and
the fourth light beam separated by the first color separation element enters the wavelength conversion element.

2. The light source device according to claim 1, wherein the fourth light beam reflected by the first color separation element is reflected by each of the first optical layer and the second polarization split layer to thereby enter the wavelength conversion element.

3. The light source device according to claim 2, wherein the second polarization split layer separates the fourth light beam emitted from the wavelength conversion element into light polarized in the first polarization direction and light polarized in the second polarization direction.

4. The light source device according to claim 3, wherein the second optical layer transmits the fourth light beam which is transmitted through the second polarization split layer in the third direction, and is polarized in the first polarization direction toward the third direction.

5. The light source device according to claim 3, further comprising:
a first retardation element which is disposed on a light path of the fourth light beam between the second polarization split layer and the wavelength conversion element, and is configured to provide a phase difference of ¼ to the fourth light beam.

6. A light source device comprising:
a light source section configured to emit a first light beam which has a first wavelength band and includes light polarized in a first polarization direction and light polarized in a second polarization direction different from the first polarization direction;
a first polarization split layer which is configured to transmit the first light beam entering the first polarization split layer from the light source section along a first direction and polarized in the first polarization direction toward the first direction, and is configured to reflect the first light beam polarized in the second polarization direction toward a second direction crossing the first direction;
a first optical layer disposed at the first direction side of the first polarization split layer, and configured to transmit the first light beam which enters the first optical layer along the first direction from the first polarization split layer, and is polarized in the first polarization direction toward the first direction;

a second polarization split layer disposed at the first direction side of the first optical layer, and configured to transmit the first light beam which enters the second polarization split layer along the first direction from the first optical layer, and is polarized in the first polarization direction;

a second optical layer disposed at the first direction side of the second polarization split layer, and configured to reflect the first light beam which enters the second optical layer along the first direction from the second polarization split layer, and is polarized in the first polarization direction toward the second direction;

a diffusion element configured to diffuse the first light beam entering the diffusion element along the second direction from the first polarization split layer, and configured to emit the first light beam diffused toward a third direction as an opposite direction to the second direction;

a wavelength conversion element configured to perform wavelength conversion on the first light beam which enters the wavelength conversion element along the second direction from the second optical layer, and is polarized in the first polarization direction, and configured to emit a second light beam having a second wavelength band different from the first wavelength band toward the third direction; and a first color separation element disposed at a fourth direction side of the first polarization split layer, the fourth direction being an opposite direction to the first direction, wherein the second light beam enters the second polarization split layer along the third direction from the wavelength conversion element, the second polarization split layer transmits the second light beam polarized in the first polarization direction toward the third direction, and reflects the second light beam polarized in the second polarization direction toward the fourth direction, the second optical layer transmits the second light beam which enters the second optical layer along the third direction from the second polarization split layer and is polarized in the first polarization direction toward the third direction, the second light beam polarized in the second polarization direction enters the first optical layer along the fourth direction, the first optical layer separates the second light beam polarized in the second polarization direction into a third light beam having a third wavelength band different from the second wavelength band, and a fourth light beam having a fourth wavelength band different from the second wavelength band and the third wavelength band, the first polarization split layer transmits the first light beam which is emitted along the third direction from the diffusion element and enters the first polarization split layer toward the third direction, and transmits the fourth light beam which enters the first polarization split layer in the fourth direction from the first optical layer, the first optical layer transmits the first light beam which is emitted along the third direction from the first polarization split layer and enters the first optical layer toward the third direction, the first color separation element transmits the first light beam emitted from the light source section toward the first direction, and reflects the fourth light beam which enters the first color separation element in the fourth direction from the first polarization split layer and has the fourth wavelength band toward the first direction, and the fourth light beam reflected by the first color separation element enters the wavelength conversion element.

7. The light source device according to claim 6, wherein the first polarization split layer and the first optical layer transmit the fourth light beam having the fourth wavelength band, and the second polarization split layer reflects the fourth light beam which is reflected by the first color separation element and is transmitted through the first polarization split layer and the first optical layer toward the second direction to make the fourth light beam enter the wavelength conversion element.

8. The light source device according to claim 7, wherein the second polarization split layer separates the fourth light beam reflected by the wavelength conversion element into light polarized in the first polarization direction and light polarized in the second polarization direction.

9. The light source device according to claim 8, wherein the second optical layer transmits the fourth light beam which is transmitted through the second polarization split layer in the third direction, and is polarized in the first polarization direction toward the third direction.

10. The light source device according to claim 8, further comprising:

a first retardation element which is disposed on a light path of the fourth light beam between the second polarization split layer and the wavelength conversion element, and is configured to provide a phase difference of ¼ to the fourth light beam.

11. The light source device according to claim 1, further comprising:

a second retardation element which is disposed between the first polarization split layer and the diffusion element, and which the first light beam polarized in the second polarization direction enters along the second direction from the first polarization split layer.

12. The light source device according to claim 1, wherein the light source section includes a light emitting element configured to emit light in the first wavelength band, and a third retardation element which the light emitted from the light emitting element enters, and which emits the first light beam.

13. The light source device according to claim 12, wherein the third retardation element is made rotatable around a rotational axis along a proceeding direction of light entering the third retardation element.

14. The light source device according to claim 1, further comprising:

a first transparent substrate having a first surface and a second surface facing to an opposite direction to the first surface, wherein the first polarization split layer is provided to the first surface of the first transparent substrate, and the first optical layer is provided to the second surface of the first transparent substrate.

15. The light source device according to claim 14, further comprising:

a second transparent substrate having a third surface and a fourth surface facing to an opposite direction to the third surface, wherein the third surface of the second transparent substrate and the second surface of the first transparent substrate are opposed to each other, the second polarization split layer is provided to the third surface of the second transparent substrate, and the second optical layer is provided to the fourth surface of the second transparent substrate.

16. The light source device according to claim 15, further comprising:
- a first mirror disposed at a fifth direction side of the first transparent substrate and the second transparent substrate, the fifth direction crossing the first direction, the second direction, the third direction, and the fourth direction;
- a second mirror disposed so as to be opposed to the first mirror, and disposed at a sixth direction side of the first transparent substrate and the second transparent substrate, the sixth direction being an opposite direction to the fifth direction; and
- a third mirror which is disposed so as to cross the first transparent substrate and the second transparent substrate, and couples an end part in the first direction of the first mirror and an end part in the first direction of the second mirror to each other.

17. The light source device according to claim 1, wherein the second optical layer is a dichroic mirror configured to reflect the first light beam and transmit the second light beam.

18. The light source device according to claim 1, wherein the first optical layer is a dichroic mirror configured to transmit the first light beam and reflect the second light beam.

19. The light source device according to claim 1, further comprising:
- a second color separation element disposed at the third direction side of the first optical layer, and configured to separate light emitted from the first optical layer into a fifth light beam having the first wavelength band and a sixth light beam having the third wavelength band; and
- a third color separation element disposed at the third direction side of the second optical layer, and configured to separate light emitted from the second optical layer into a seventh light beam having the third wavelength band and an eighth light beam having the fourth wavelength band.

20. A projector comprising:
the light source device according to claim 19;
a light modulation device configured to modulate light from the light source device in accordance with image information; and
a projection optical device configured to project the light modulated by the light modulation device.

21. The projector according to claim 20, further comprising:
a homogenization device disposed between the light source device and the light modulation device, wherein
the homogenization device includes
- a pair of multi-lenses configured to divide the light entering the pair of multi-lenses from the light source device into a plurality of partial light beams, and
- a superimposing lens configured to superimpose the plurality of partial light beams entering the superimposing lens from the pair of multi-lenses on the light modulation device.

22. The projector according to claim 21, wherein
the light modulation device includes a liquid crystal panel having a plurality of pixels, and a microlens array which is disposed at a light incident side of the liquid crystal panel, and has a plurality of microlenses corresponding to the plurality of pixels,
the pixels each include a first sub-pixel, a second sub-pixel, a third sub-pixel, and a fourth sub-pixel, and
the microlens makes the fifth light beam enter the first sub-pixel, makes the sixth light beam enter the second sub-pixel, makes the seventh light beam enter the third sub-pixel, and makes the eighth light beam enter the fourth sub-pixel.

* * * * *